(12) United States Patent
Stein

(10) Patent No.: US 9,052,083 B2
(45) Date of Patent: Jun. 9, 2015

(54) LIGHT FIXTURE WITH INNER AND OUTER TROUGH REFLECTORS

(75) Inventor: Paul L. Stein, O'Fallon, MO (US)

(73) Assignee: Code 3, Inc., St. Louis, MO (US)

( * ) Notice: Subject to any disclaimer, the term of this patent is extended or adjusted under 35 U.S.C. 154(b) by 837 days.

(21) Appl. No.: 12/604,474

(22) Filed: Oct. 23, 2009

(65) Prior Publication Data

US 2010/0110677 A1 May 6, 2010

Related U.S. Application Data

(60) Provisional application No. 61/234,166, filed on Aug. 14, 2009, provisional application No. 61/110,133, filed on Oct. 31, 2008.

(51) Int. Cl.
| | |
|---|---|
| *F21V 1/00* | (2006.01) |
| *F21V 7/00* | (2006.01) |
| *B60Q 1/26* | (2006.01) |
| *F21S 4/00* | (2006.01) |
| *F21V 13/04* | (2006.01) |
| *F21V 5/00* | (2006.01) |
| *F21V 7/04* | (2006.01) |
| *F21V 7/05* | (2006.01) |
| *F21V 7/06* | (2006.01) |
| *F21V 7/09* | (2006.01) |
| *F21Y 101/02* | (2006.01) |
| *F21Y 103/00* | (2006.01) |

(52) U.S. Cl.
CPC .......... *F21V 7/0025* (2013.01); *B60Q 1/2611* (2013.01); *F21S 4/008* (2013.01); *F21V 5/007* (2013.01); *F21V 7/005* (2013.01); *F21V 7/048* (2013.01); *F21V 7/05* (2013.01); *F21V 7/06* (2013.01); *F21V 7/09* (2013.01); *F21V 13/04* (2013.01); *F21Y 2101/02* (2013.01); *F21Y 2103/003* (2013.01)

(58) Field of Classification Search
CPC ..... F21V 7/0025; F21V 5/007; B60Q 1/2611; F21S 4/008; F21Y 2101/02; F21Y 2103/003
USPC ............... 362/235, 297, 217.05, 217.06, 800
See application file for complete search history.

(56) References Cited

U.S. PATENT DOCUMENTS

| | | | |
|---|---|---|---|
| 4,531,180 A * | 7/1985 | Hernandez | .................... 362/297 |
| 4,562,517 A * | 12/1985 | Pankin | .......... 362/147 |
| 5,418,384 A | 5/1995 | Yamana et al. | |
| 5,813,753 A | 9/1998 | Vriens et al. | |
| 5,887,968 A | 3/1999 | Logan | |
| 6,045,240 A | 4/2000 | Hochstein | |
| 6,158,882 A | 12/2000 | Bischoff, Jr. | |
| 6,257,737 B1 | 7/2001 | Marshall et al. | |
| 6,320,182 B1 | 11/2001 | Hubble, III et al. | |
| 6,481,130 B1 | 11/2002 | Wu | |

(Continued)

FOREIGN PATENT DOCUMENTS

| | | |
|---|---|---|
| DE | 4443916 C1 | 5/1996 |
| DE | 19648310 A1 | 5/1998 |
| EP | 1467139 A2 | 10/2004 |

*Primary Examiner* — Anh Mai
*Assistant Examiner* — Jessica M Apenteng
(74) *Attorney, Agent, or Firm* — Stoel Rives LLP

(57) ABSTRACT

A light fixture includes a light source and inner and outer trough reflectors. The inner and outer trough reflectors may have coaxial imaginary linear focal axes. Each of the inner and outer trough reflectors may be configured to collimate light emitted from the light source.

20 Claims, 21 Drawing Sheets

(56) References Cited

U.S. PATENT DOCUMENTS

| | | |
|---|---|---|
| 6,641,284 B2 | 11/2003 | Stopa et al. |
| 6,709,131 B1 * | 3/2004 | Herst et al. .................... 362/223 |
| 6,793,368 B2 * | 9/2004 | Ladstatter .................... 362/221 |
| 6,951,409 B2 | 10/2005 | Hsien |
| 7,244,053 B2 | 7/2007 | Bader et al. |
| 8,162,504 B2 * | 4/2012 | Zhang et al. ............. 362/217.05 |
| 2002/0172046 A1 * | 11/2002 | Perlo et al. .................... 362/304 |
| 2005/0111220 A1 * | 5/2005 | Smith .......................... 362/235 |
| 2006/0262551 A1 | 11/2006 | Fallahi et al. |
| 2012/0092859 A1 * | 4/2012 | Gregoris ................. 362/217.06 |

\* cited by examiner

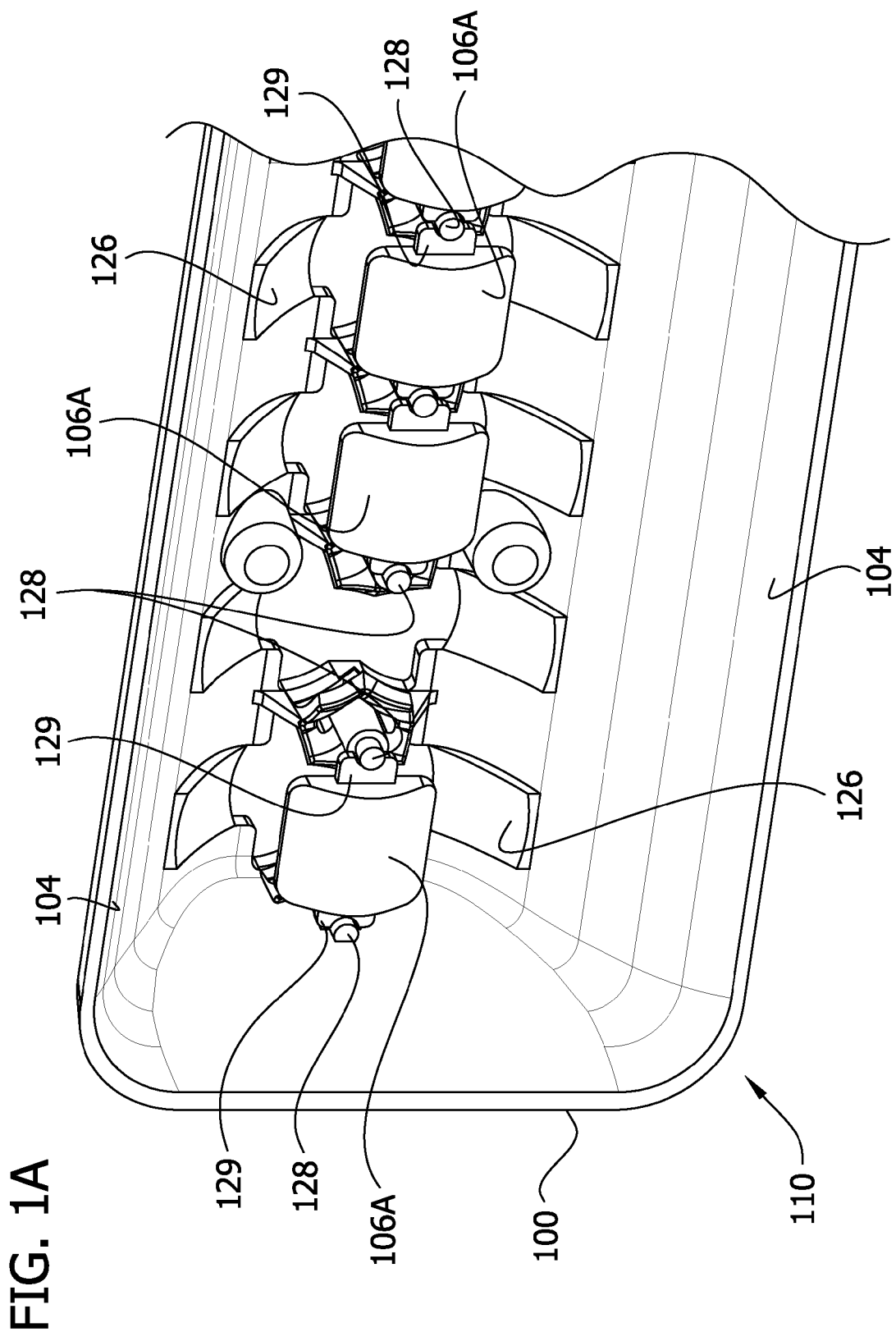

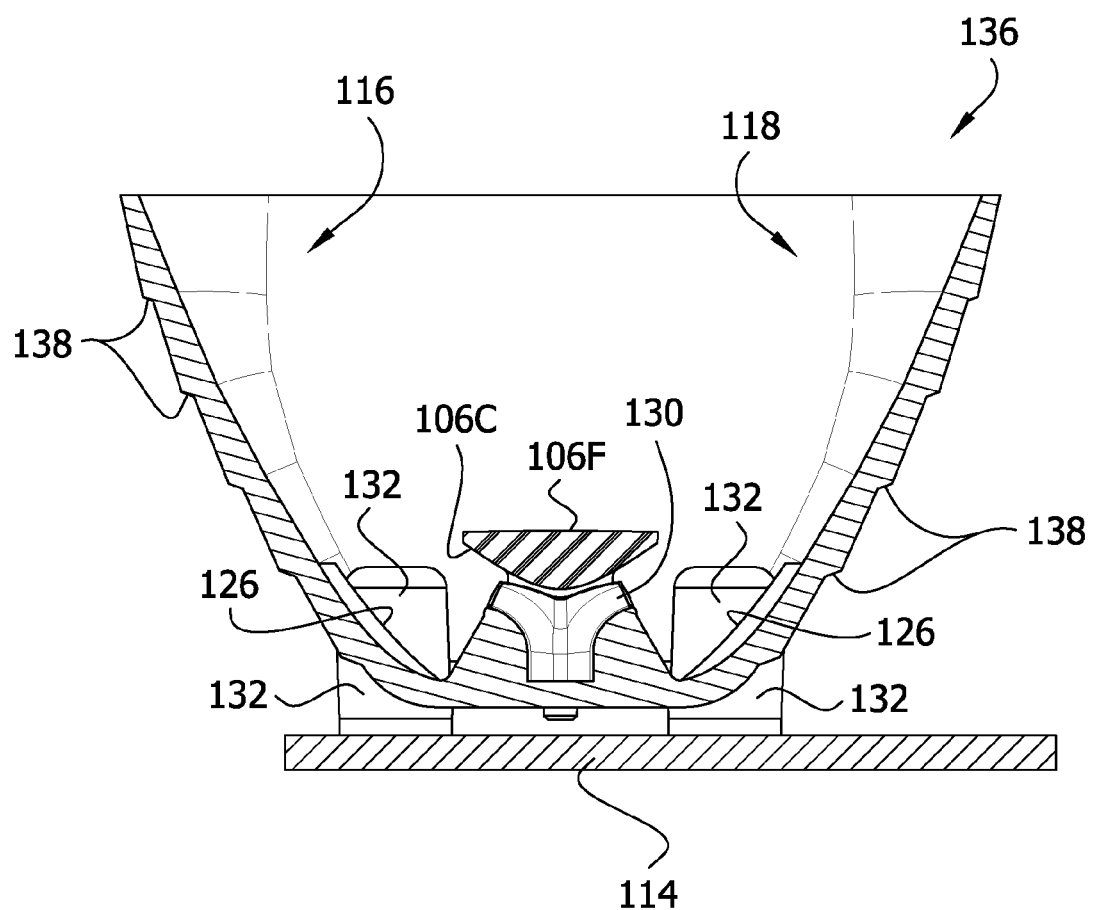

LIGHT FIXTURE WITH INNER AND OUTER TROUGH REFLECTORS

CROSS-REFERENCE TO RELATED APPLICATIONS

The present application claims priority to U.S. Provisional Patent Application No. 61/110,133, filed Oct. 31, 2008, and U.S. Provisional Patent Application No. 61/234,166, filed Aug. 14, 2009, each of which is herein incorporated by reference in its entirety.

FIELD OF THE INVENTION

The present invention generally relates to a light fixture with inner and outer trough reflectors.

BACKGROUND

Trough reflectors for light sources are generally known. Such reflectors tend to focus light by using parabolic reflectors or concave reflectors which are curved. Such devices tend to locate the light sources at a focal point of the curved reflectors so that the reflectors collimate light.

SUMMARY

In one aspect, a light fixture generally comprises a light source for emitting light, an outer trough reflector, and an inner trough reflector. The outer trough reflector has opposing reflective interior surfaces at least partially defining an outer reflecting cavity. The reflective interior surfaces of the outer trough reflector are configured to reflect incident light emitted from the light source so that the incident light exits the outer trough reflector. The inner trough reflector is disposed in the outer reflecting cavity. The inner trough reflector has opposing reflective interior surfaces at least partially defining an inner reflecting cavity. The reflective interior surfaces of the inner trough reflector are configured to reflect incident light emitted from the light source so that the incident light exits the inner trough reflector.

In another aspect, a light fixture generally comprises a plurality of spaced apart LEDs arranged as a linear array, an outer trough reflector, and an inner trough reflector. The outer trough reflector has opposing reflective, parabolic interior surfaces at least partially defining an outer reflecting cavity. The reflective, parabolic interior surfaces of the outer trough reflector are configured to collimate incident light emitted from the LEDs. The inner trough reflector is disposed in the outer reflecting cavity. The inner trough reflector has opposing reflective, parabolic interior surfaces at least partially defining an inner reflecting cavity. The reflective, parabolic interior surfaces of the inner trough reflector are configured to collimate incident light emitted from the LEDs. The outer reflecting cavity and the inner reflecting cavity have coaxial imaginary linear focal axes.

Other features will be in part apparent and in part pointed out hereinafter.

BRIEF DESCRIPTION OF THE DRAWINGS

FIG. 1A is a fragmentary perspective view of a first embodiment of a light fixture of the present invention having an outer trough reflector and a discrete, individual lens dedicated to each LED.

FIG. 6B is a cross sectional view of the light fixture of FIG. 2 taken along lines 6-6 of FIG. 4.

Corresponding reference characters indicate corresponding parts throughout the drawings.

DETAILED DESCRIPTION OF THE DRAWINGS

Figure 7:
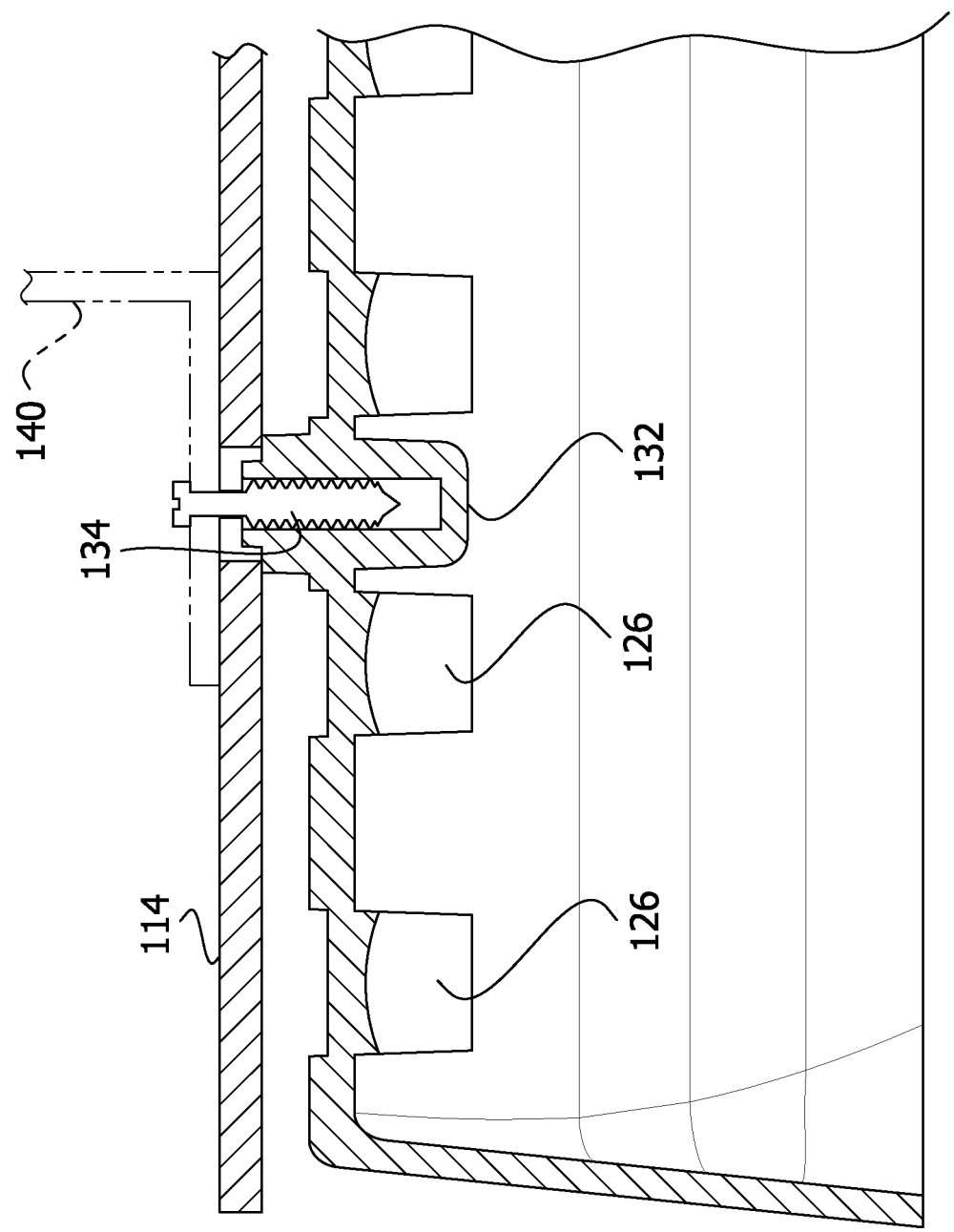
FIG. 7 is an enlarged, fragmentary longitudinal sectional view of the light fixture of FIG. 2 taken along lines 7-7 in FIG. 3.
Figure 8A:
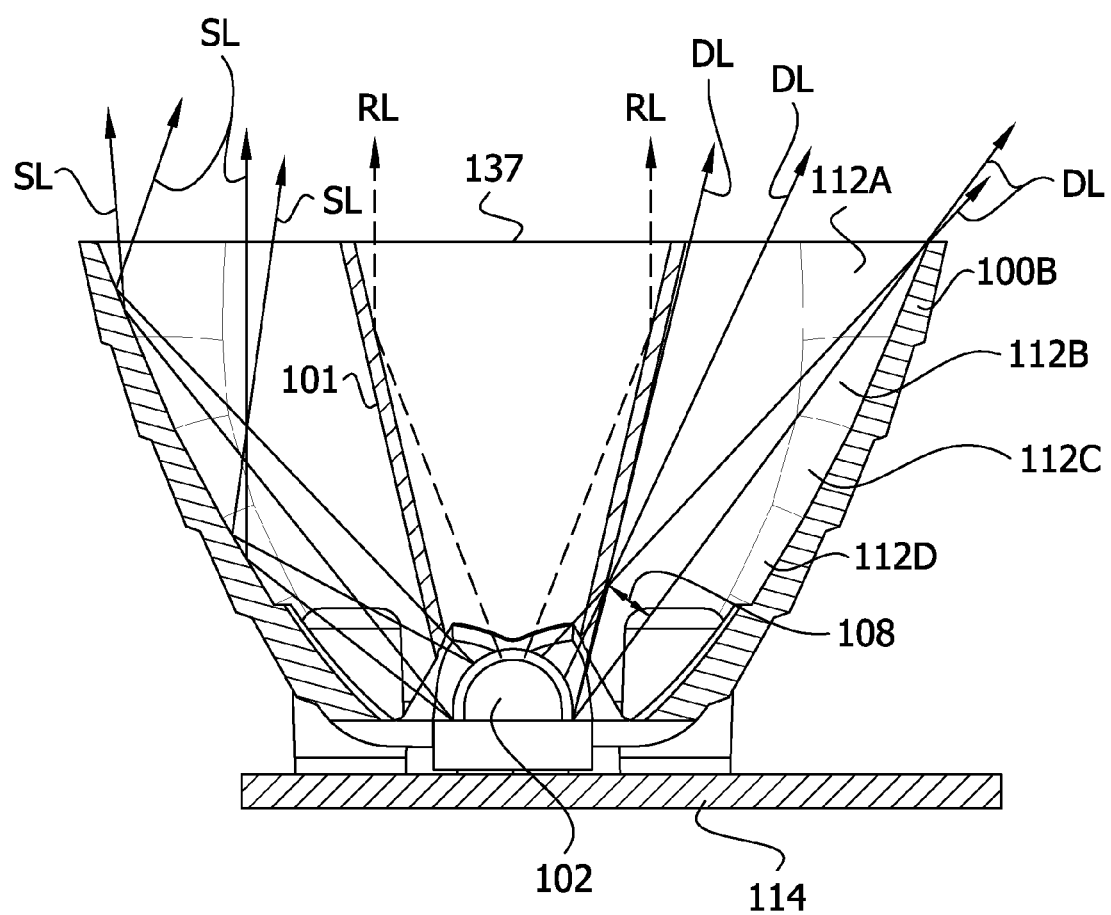
FIG. 8A is a cross sectional view of the light fixture of FIG. 1B taken along lines 5A-5A of FIG. 1B.
Figure 8B:
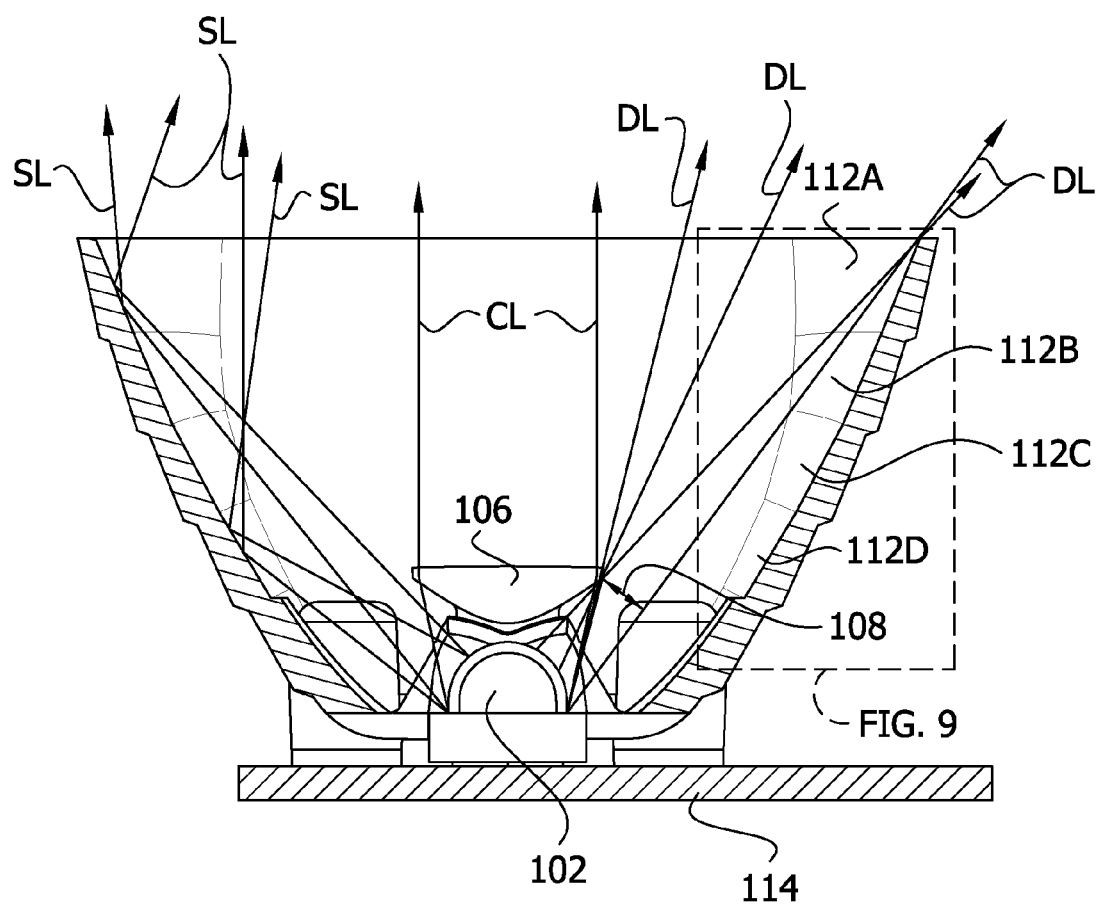
FIG. 8B is a cross sectional view of the light fixture of FIG. 2 taken along lines 5-5 of FIG. 4.

In some embodiments (FIGS. 1-9), a light fixture that includes a trough provides at least three different types of light which exit the trough: light diverging from light sources in the trough (diverging light DL; see FIGS. 8A and 8B), scattered or dissipated light reflected by flat surfaces of the trough (scattered light SL; see FIGS. 8A and 8B) and collimated light from a lens (including a lens array) positioned over the light sources (collimated light CL; see FIGS. 8A and 8B). The light diverging DL from the light sources in the trough is not reflected and is not collimated. The scattered or dissipated light SL is reflected by flat surfaces of the trough and is not collimated. The collimated light CL from the lenses positioned over the light sources is a substantially parallel beam of light which is not scattered and which is not diverging. Optionally, in the embodiment employing a second reflective trough 101 (see FIGS. 1B, 6A and 8A), a fourth type of light, reflected light RL, may exit the trough. In one embodiment, the second reflective trough 101 may be used without the lens so that there would not be collimated light CL.

Referring to the figures, a light fixture, generally indicated at 110, includes a trough 100 having LED light sources 102 positioned therein along a longitudinal axis A and has flat, planar, reflective sides 104 scattering light from the light sources 102 (e.g., light emitting diodes, herein LEDs) so that scattered light reflected by the flat sides 104 exits the trough 100. In the embodiment of FIG. 1A, a plurality of lens 106A form an array of discrete, individual lens wherein each lens 106A is dedicated to one LED light source 102 (LEDs not shown in FIG. 1A). The array of lenses 106A is arranged along the longitudinal axis A of the trough 100 and is located over the light sources 102 within the trough 100 for collimating light from the light sources 102 so that collimated light exits the trough 100 as a focused beam, which may include parallel light rays. Thus, each lens 106A collimates the light from essentially one LED 102.

Figure 1B:
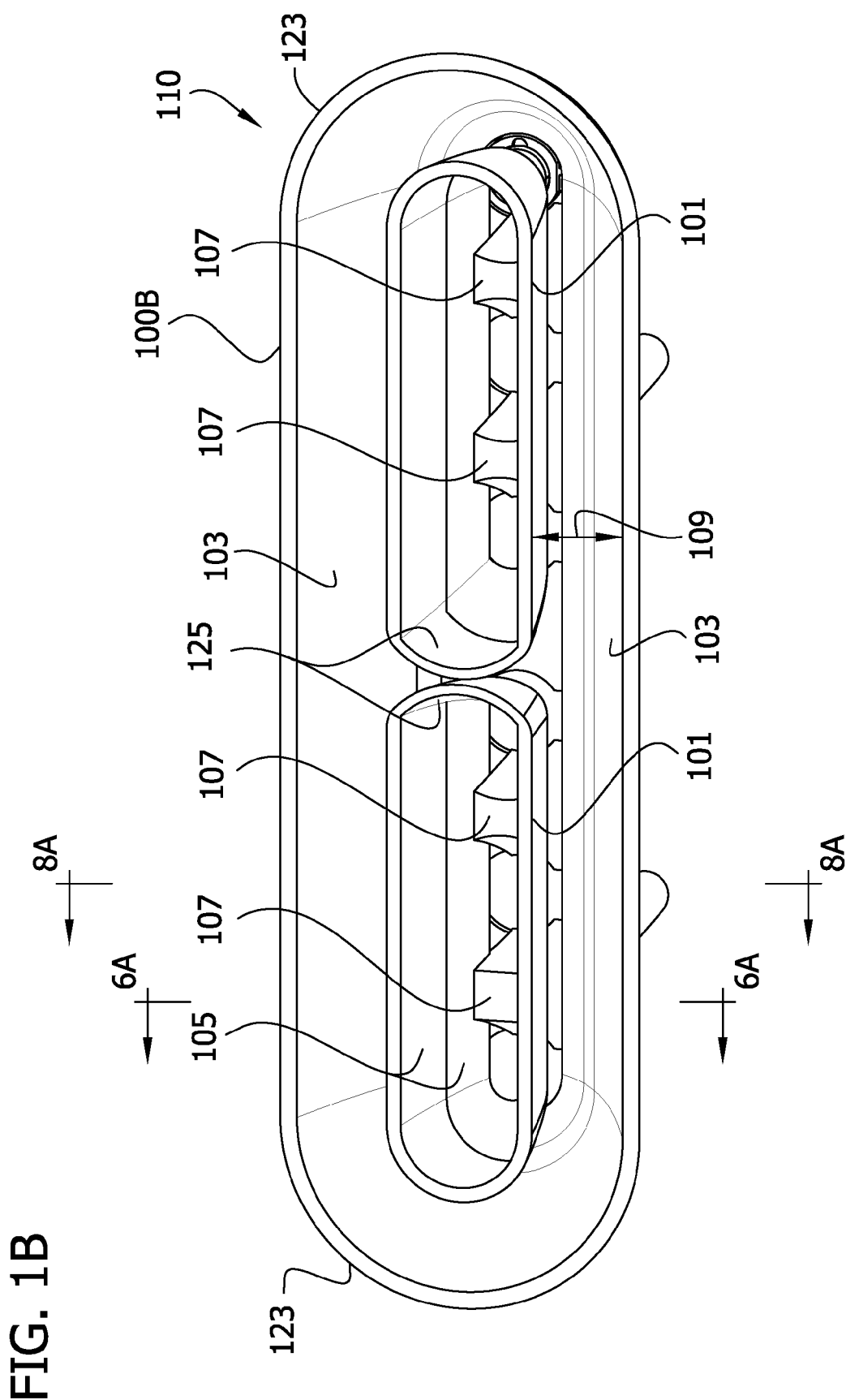
FIG. 1B is a perspective view of a second embodiment of a light fixture of the present invention having an outer trough reflector and inner or second trough reflectors.

A light fixture 110 as illustrated in FIG. 1B includes multiple troughs. An outer trough 100B having rounded ends 123 has sides 103 which may be flat or may be curved. A plurality of supports 107 are located between the LEDs 102 (LEDs not shown in FIG. 1B) to support one or more inner or second reflective troughs 101 positioned coaxially within the outer trough 100B. As noted below and illustrated in FIGS. 1B, 6A and 8A, the second reflective troughs 101 provide reflected light (RL).

Figure 1C:
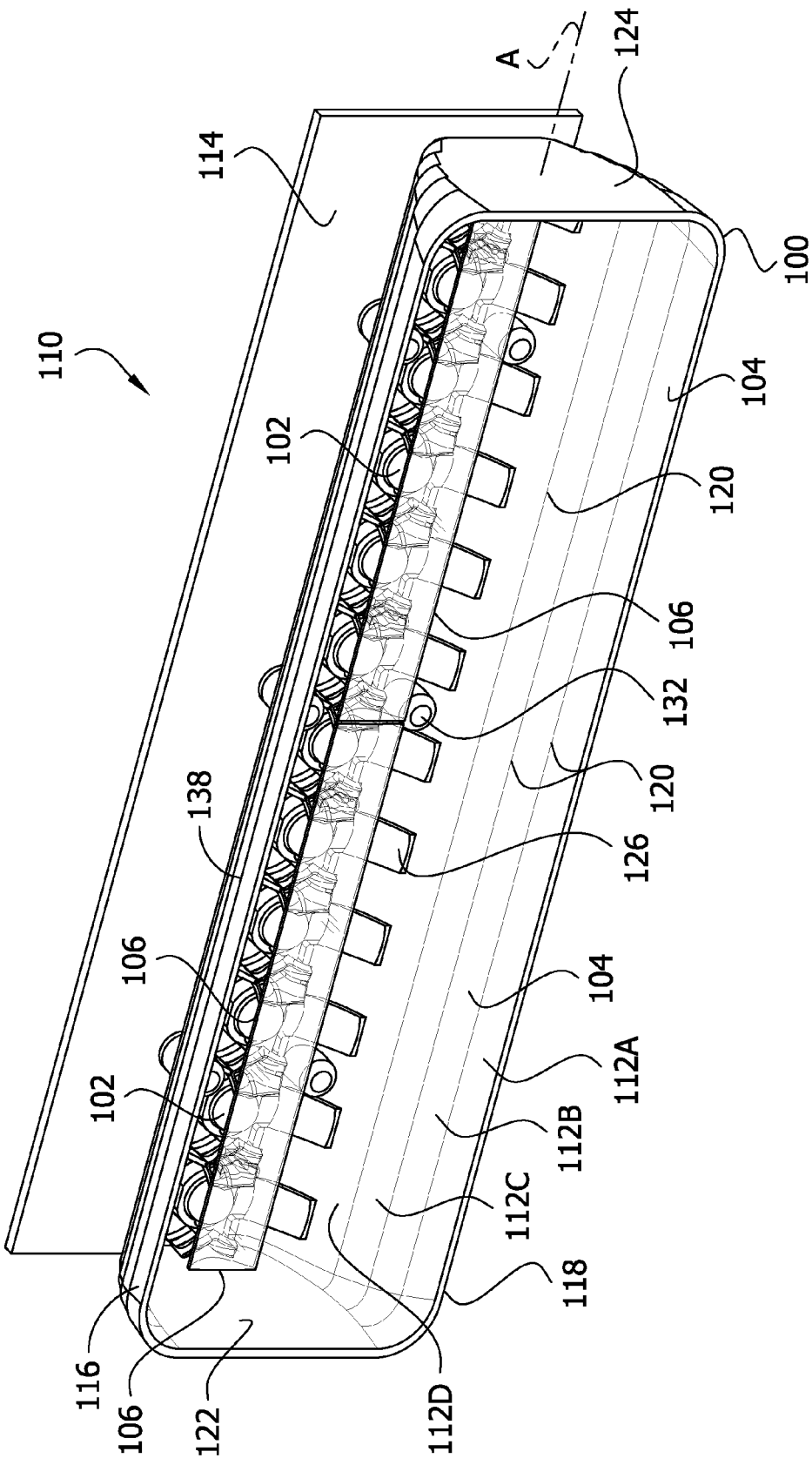
FIG. 1C is a perspective view of a third embodiment of a light fixture of the present invention having an outer trough reflector and a continuous, one piece lens over all LEDs.
Figure 2:
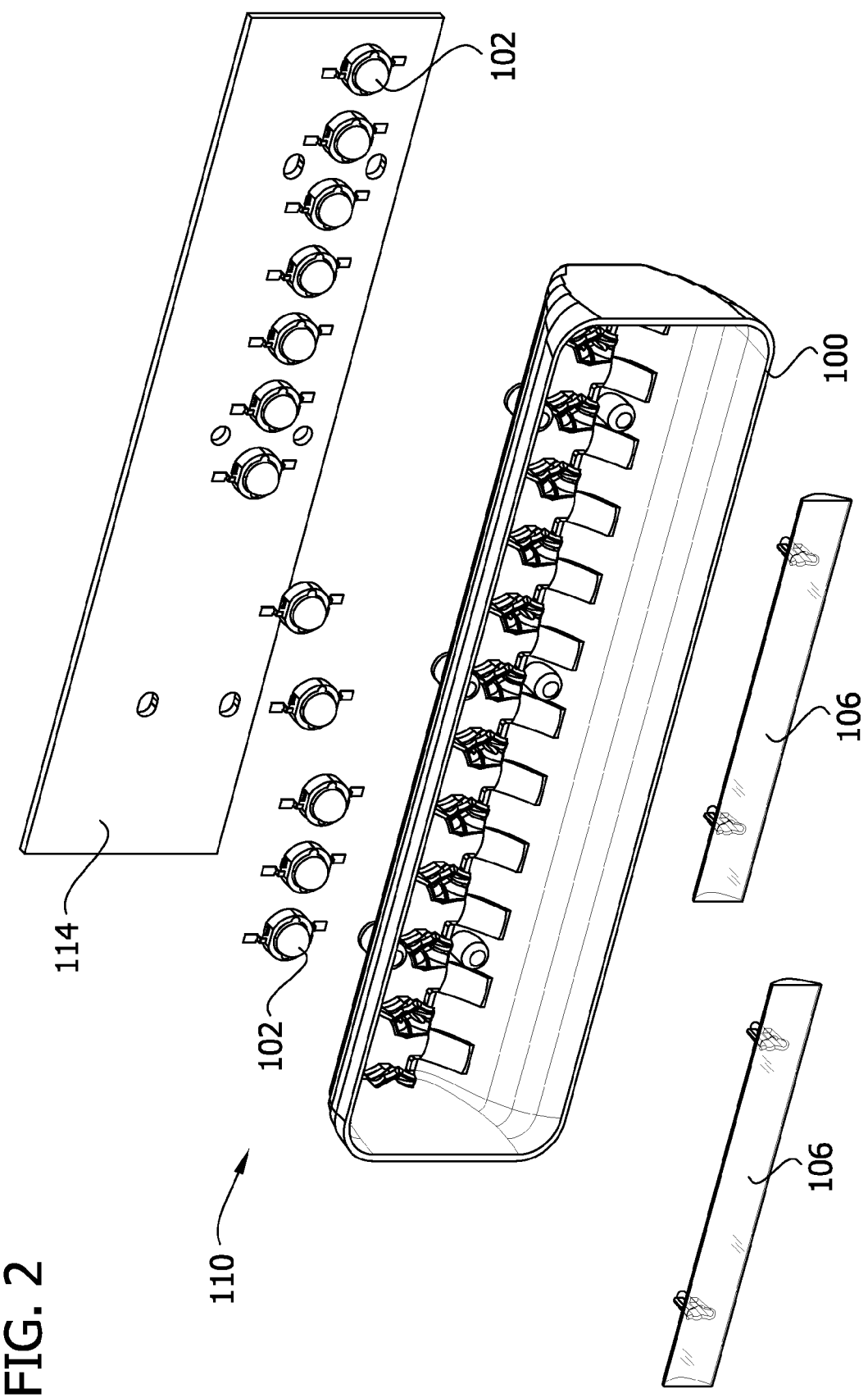
FIG. 2 is an exploded view of a fourth embodiment of a light fixture similar to the embodiment in FIG. 1.
Figure 3:
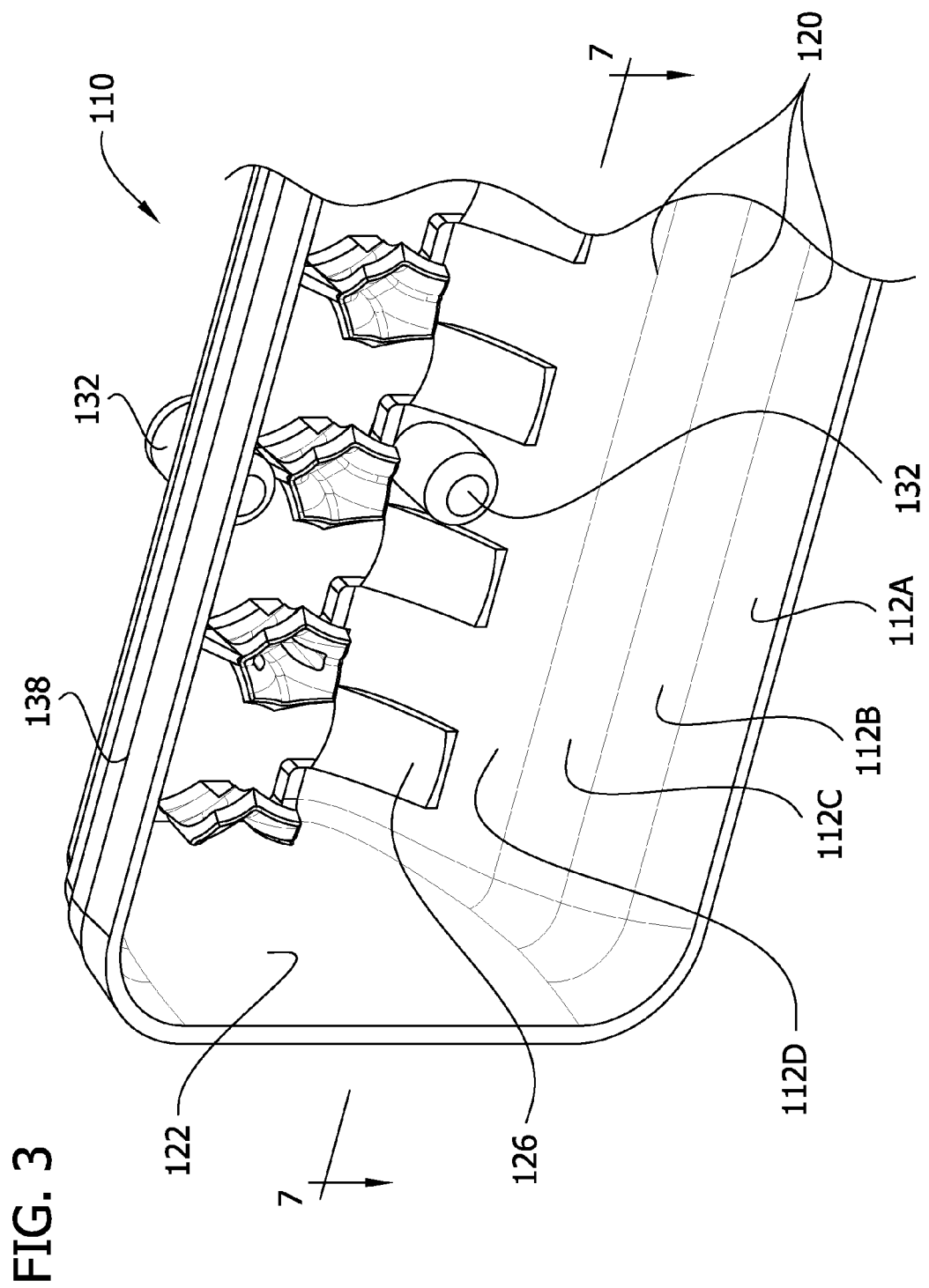
FIG. 3 is an enlarged view of an end portion of the outer trough reflector of FIG. 2.

In the embodiment of FIG. 1C, a longitudinal, continuous, integral, one piece lens 106 along the longitudinal axis A of the trough 100 is located over the light sources 102 within the trough 100 for collimating light from the light sources 102 so that collimated light exits the trough 100 as a focused beam, which may include parallel light rays. A gap 108 between the lens 106 and the flat sides 104 allows a substantial amount of light emitted by the light sources 102 to escape and be directed at an observer through the gap and allows the light to exit the trough as directly diverging from the light sources 102. As a result, a substantial portion of light (referred to as directly diverging light) does not impinge of the flat sides 104 of the trough 100 so that it is not scattered by the sides and this substantial portion of directly diverging light is not transmitted by the lens 106 so that it is not collimated.

Thus, as shown in FIGS. 8A and 8B, diverging light DL exits the trough 100 and diverges from the light source 102, scattered light SL reflected by the flat surfaces 104 exits the trough, and collimated light CL collimated by the lens 106 exits the trough. This means that an observer of the light fixture 110 mounted in a light bar would see one or more of three types of light from the light sources: diverging light DL directly from the light sources, scattered light SL from the flat panels and collimated light CL from the lens. In some configurations, it is contemplated that an observer would see two or all three types of light, depending on the location of the observer, the various angular arrangement of the flat panels 112 and the width W of the lens 106. Because of the flat panels 112, an observer of the reflected, scattered light SL will see multiple mirrored images of the light sources so that the light from the trough 100 appears to be more evenly filled than light from a curved or parabolic trough. In other words, to an observer the scattered light SL appears to be originating from a plurality of sources rather than from a point source or a focal point. For simplicity, FIGS. 8A and 8B only illustrate the diverging light DL on the right side of trough 100 and the scattered light SL on the left side of the trough 100. Since the trough is symmetrical about a vertical plane passing through the linear axis A of the light sources, diverging light DL will also be on the left side and scattered light SL on the right side. As additionally shown in FIG. 8A, in the embodiment including reflective trough 101, a fourth type of light, reflected light RL, also exits the opening 137. In certain embodiments of the lens 106, there may be some stray rays of light which are not collimated as collimated light CL. At least some of these stray rays of light will be reflected by reflective trough 101 and directed as reflected light RL through the exit opening 137 toward an observer.

In general, it is contemplated that the trough 100 may be used in a light bar used on emergency vehicles for warning observers that the vehicle is approaching or at a particular location. In one embodiment, the trough 100 has a plurality of at least two flat panels 112 forming the sides of the trough 100. As shown in the figures, four panels 112A-112D sequentially positioned contiguous to each other from the top of the trough to the bottom are illustrated, although any number of two or more to achieve light scattering by reflection may be part of trough. Because the sides are flat panels or segments, the sides do not have a focal axis and do not have a focal point so that light impinging on the panels 112 from the light sources 102 is reflected and scattered. In other words, the sides when viewed in a cross section taken perpendicular to the longitudinal axis A of the trough do not form a curved reflective surface (such as a parabola) which would have a focal axis or a focal point.

In another embodiment, the light fixture 110 comprises a trough 100, flat panels 112, a base 114, a linear array of LED light sources 102 and a lens 106. The trough 100 has a first side 116 and a second side 118 opposite the first side 116 (e.g., opposing sides) wherein each side comprises a plurality of at least two flat panels 112 having longitudinal edges 120 which are contiguous with each other. A first end 122 and a second end 124 interconnect or link the first and second sides 116, 118 of the trough 100. The base 114 supports the trough 100. In one embodiment, it is contemplated that the base 114 be attached to one end of a support or bracket 140 (see FIG. 7). The other end of the bracket 140 would be attached to a part of a light bar, such as an extruded longitudinal member of the light bar, which supports various light fixtures in a particular orientation with other fixtures to keep the fixture aligned within the light bar. For example, the fixture 110 would be positioned to illuminate observers and would be positioned so that the collimated light would be perpendicular to an outer shell or lens of the light bar.

In one embodiment, the base 114 is a metal core printed circuit board carrying a light engine 137 (shown in block form in FIG. 5) for connection to and for energizing the light sources 102. In general, the light engine 137 may be any circuit used to illuminate the light sources 102. In one embodiment, the bracket 140 would function as a heat sink so that the base 114 would be sandwiched between the heat sink and the trough. A screw 134 may be used to attach the bracket 140 through the base 114 to the trough 100 by engaging a boss 132 thereof (see FIG. 7). In addition, a sil pad (not shown) may be located between the bracket 140 and the base 114 to facilitate heat transfer therebetween. The sil pad fills undulations to create a better contact and also acts as an electrical dielectric to electrically insulate the base 114 from the bracket 140.

The linear array of LED light sources 102 is on the base and is supported by the base 114 so that the light sources are positioned within the bottom the trough 100. The linear, longitudinal lens 106 is positioned over the linear array of light sources 102 for collimating substantially all outwardly directed light emitted by the light sources and directed toward the lens 106 and, thus, transmitted by the lens 106. This collimated light is in contrast to the scattered light from light emitted by the light sources and impinging on the panels.

Figure 4:
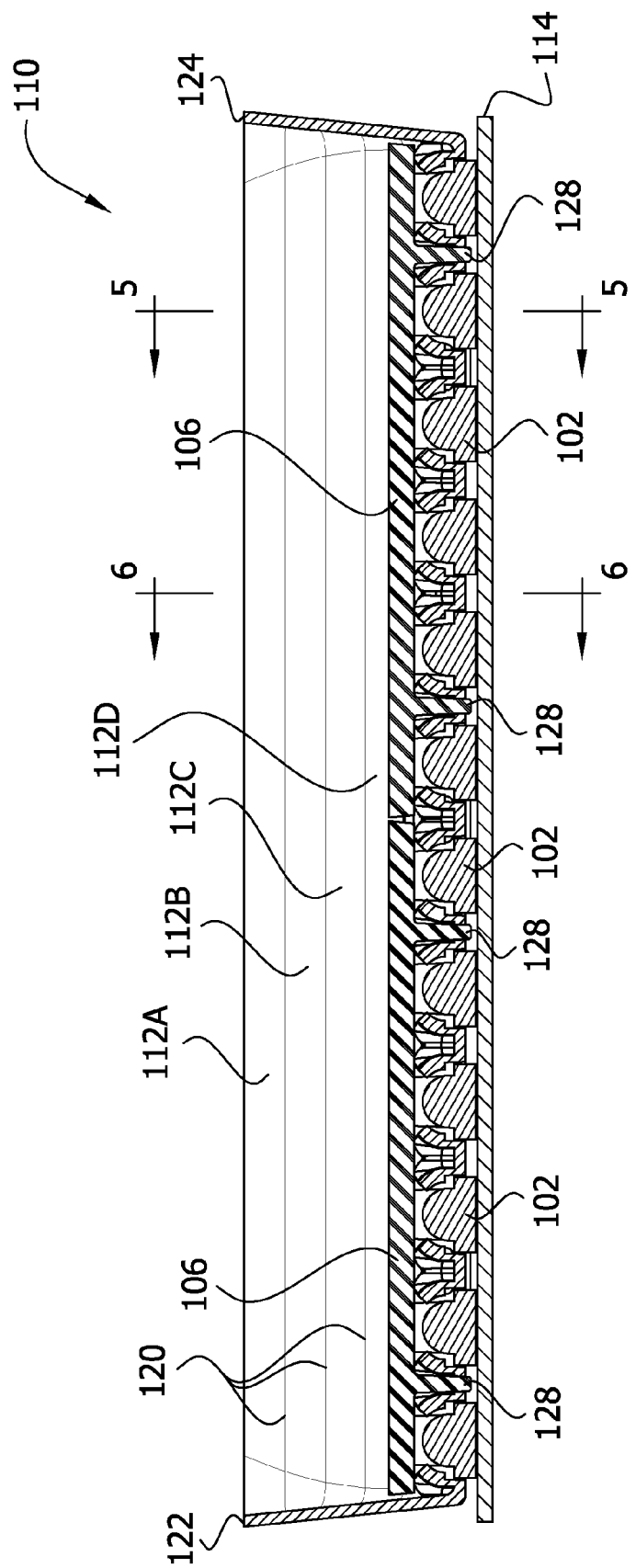
FIG. 4 is a longitudinal sectional view of the light fixture of FIG. 2.

As shown for example in FIG. 4, each of the flat panels 112A-112D has a reflective, trapezoidal surface when viewed in plan, tending to have a somewhat rectangular shape. In one embodiment, the panels provided with a vacuum metalized aluminum coating on their surface to enhance their reflectivity. A lacquer or other clear or colored coating may be applied to the panels and/or over the aluminum coating to protect the coating and inhibit oxidation.

As noted above, in one embodiment the light sources 102 comprise light emitting diodes (LEDs). However, it is contemplated that any light source may be employed. In addition, 12 LEDs are illustrated but it is contemplated that the trough may be configured for two or more LEDs. In addition, not all LEDs need to be used in a particular configuration. For example, half of the LEDs as shown in the figures may be deleted so that only every other LED is employed and every other LED opening in the trough would be empty. In addition, not all openings as illustrated in the drawings need to be part of the trough. For example, one or more of the openings shown in the figures may be deleted or additional openings may be added to accommodate more or less LEDs.

The lens 106, 106A, 106B has a first surface 106C and a second surface 106F, the first surface 106C facing the light sources 102 and having a concave shape and the second surface 106F facing an exit opening 136 of the trough 100 and being substantially flat (see FIG. 6B). Lens posts 128 project substantially perpendicularly from the curved first surface 106C and are positioned along a longitudinal central axis A of the trough 100 and a longitudinal central axis A of the lens 106, which axes are parallel to each other. The posts 128 engage lens supports 130 and support the lens 106 over the light sources 102 so that the lens 106 is positioned between the light sources 102 and the exit opening 136. In one embodiment, the lens posts 128 are heat staked within the lens supports 130. Other methods of attaching the lens to the trough are known in the art and may be optionally or additionally employed. For example, as shown in FIG. 1A, each lens 106A has an integral tab 129 which engages the heat staked posts 128 for supporting the lens 106A over each LED 102 (LEDs not shown in FIG. 1A).

Optionally, flat panel 112D adjacent to the linear array of light sources 102 may include one or more raised, curved surfaces 126 positioned on either side of the light sources 102. As shown in FIG. 6B, the surfaces 126 are curved when viewed in a vertical cross section and as shown in FIG. 7 the surfaces 126 are curved when viewed in a horizontal cross section. One purpose of these surfaces 126 is to capture some of the light from the sources 102 at the base of the trough 100 and redirect toward the exit opening 136 of the trough 100. In one embodiment, the raised curved surfaces 126 may have focal points and the surfaces 126 are positioned such that their focal points do not coincide with the light sources 102. As a result, the surfaces 126 function to only dissipate, diverge or scatter light that the surfaces 126 collect and reflect from the sources 102.

The sides 104 and ends 122, 124 of the trough comprise an integral, unitary element which may be made by injection molding. Each flat side 104 has a reflective inner surface formed by each panel 112A-112D and a corresponding outer surface 112SA-112SD opposite the reflective inner surface, wherein adjacent outer surfaces form a ridge or a step 138 (see FIGS. 5, 6B and 9). Each step 138 is opposite a corresponding continuous longitudinal edge 120 and provides some rigidity to the trough as well as helps to reduce the amount of material needed to fabricate the trough.

Figure 5:
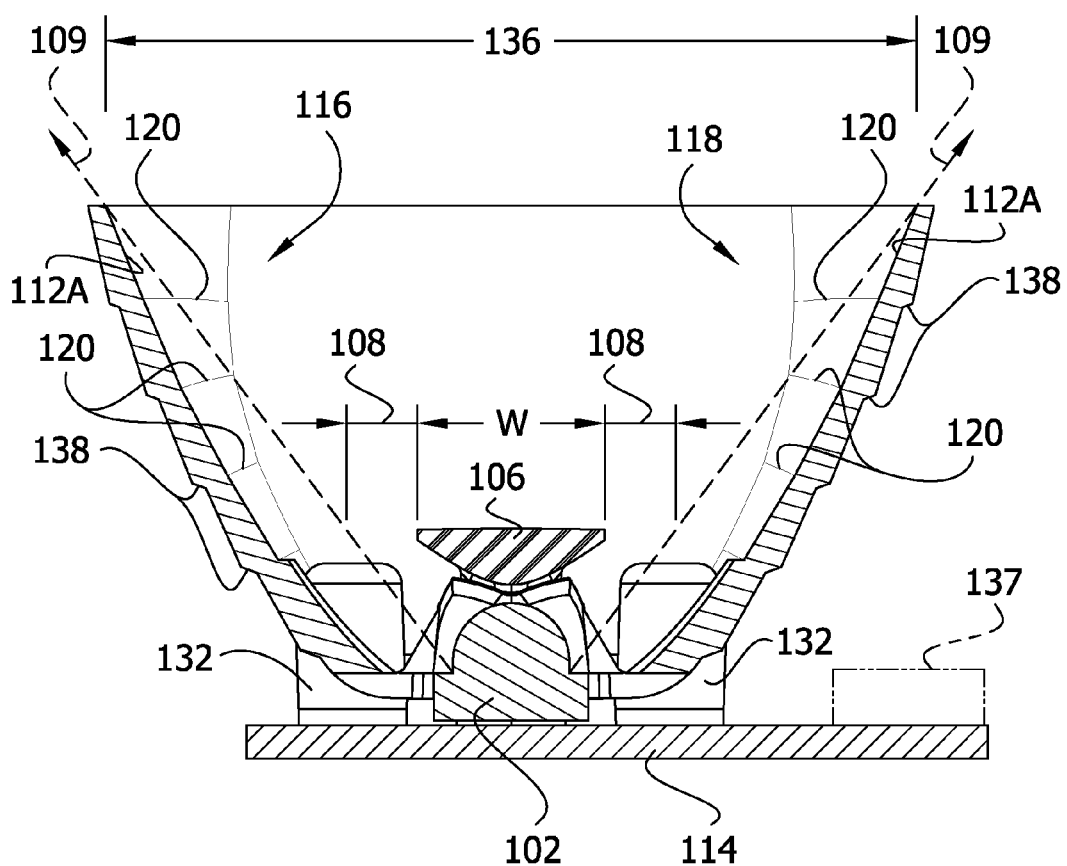
FIG. 5 is a cross sectional view of the light fixture of FIG. 2 taken through a light source along lines 5-5 of FIG. 4.

In another embodiment, a light fixture 110 comprises a trough 100 having a plurality of at least two flat panels 112 forming sides 104 of the trough. Since the panels are flat, each side does not have a focal axis and does not have a focal point. This is in contrast to a parabolic or elliptical shaped side which would have one or more focal points or one or more focal axes, as is known in the prior art. A linear array of light sources 102 is located within the trough 100, and a linear lens 106 is supported over the linear array for collimating substantially all light emitted by the light sources 102 toward the lens and transmitted by the lens 106. The flat panels 112 of the trough scatter or dissipate substantially all light emitted by the light sources 102 that strike the panels. The lens 106 has a width W such that a substantial amount of light emitted by the light sources is directed through a gap 108 between the lens 106 and the flat panels 112 so that a substantial amount of light does not impinge of the sides of the trough and a substantial amount of light is not transmitted by the lens 106. Consequently, a substantial amount of diverging light DL is directly transmitted from the light sources 102 to an observer by exiting the trough without being collimated by the lens 106 and without being reflected by the flat panels 112. In one embodiment, as shown in FIG. 5, the gap 108 is between an edge of the lens 106 and a ray of light as indicated by the dashed line 109. The dashed line 109 represents a ray of light that diverges from the light source 102 and immediately adjacent to an edge 148 (see FIG. 9) of panel 112A which defines the exit opening 136.

Figure 9:
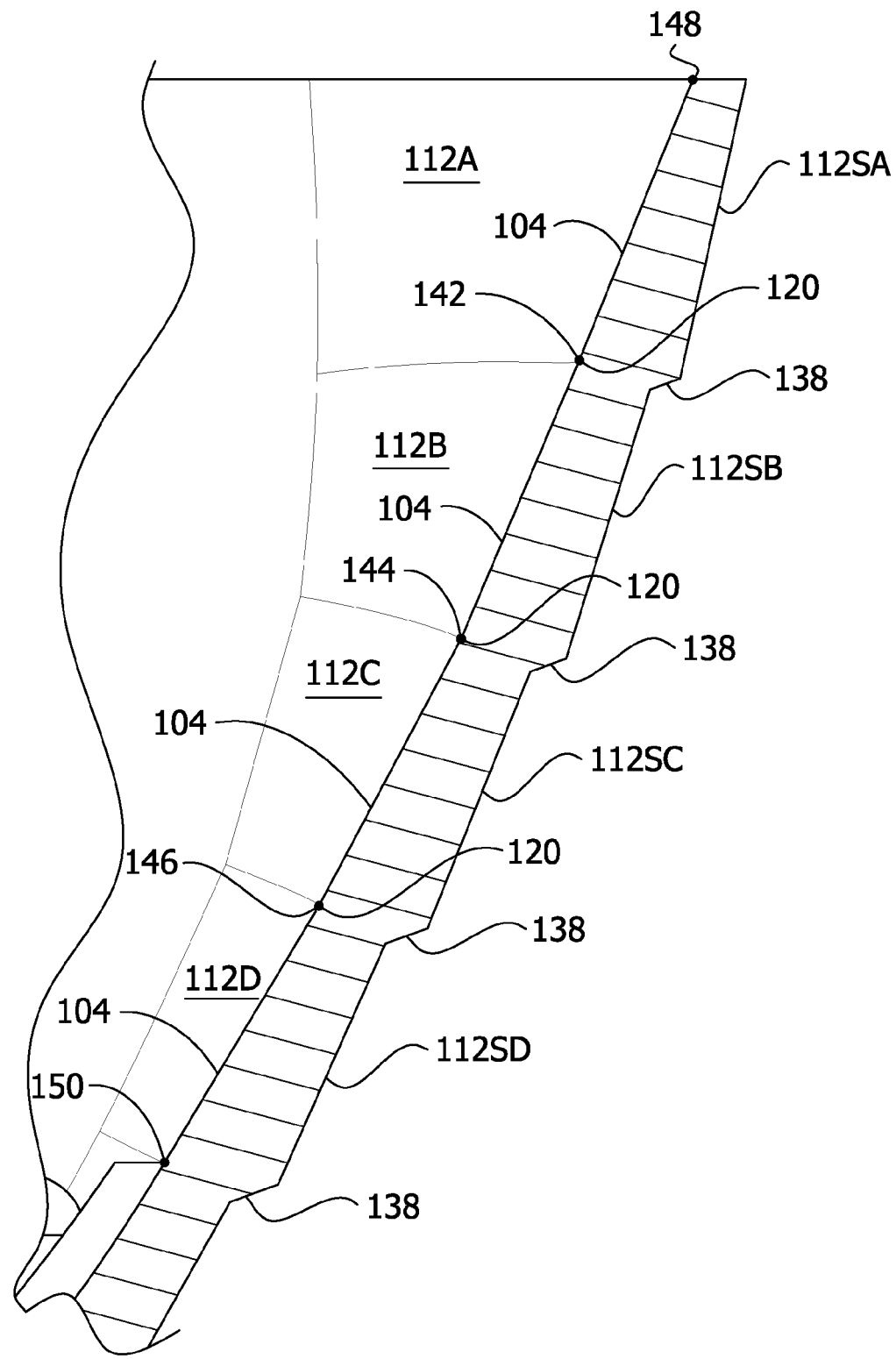
FIG. 9 is an enlarged, fragmentary view of FIG. 8.
Figure 10:
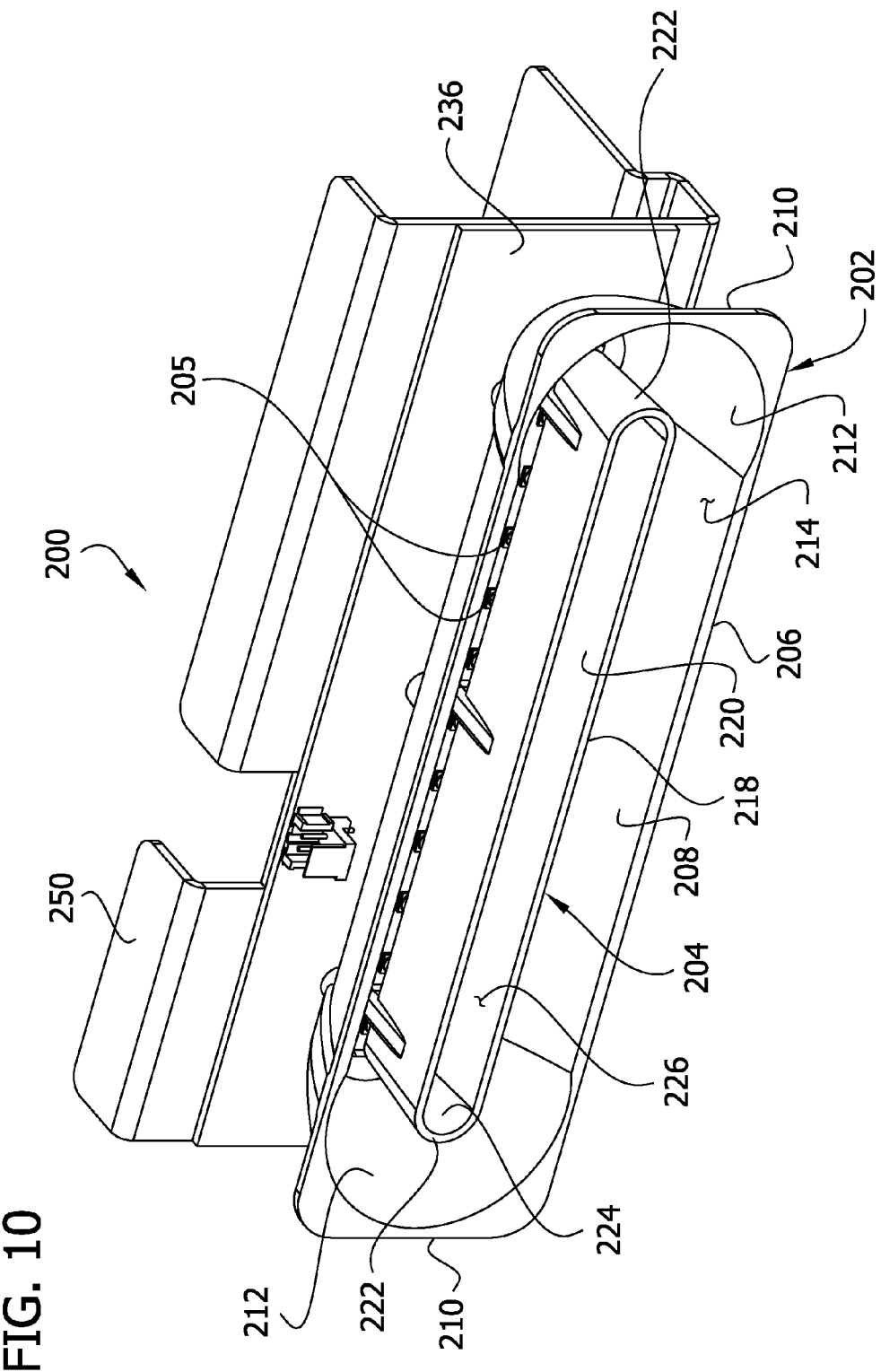
FIG. 10 is a perspective view of fifth embodiment of a light fixture including an inner trough reflector and an outer trough reflector.

As shown in FIG. 9, the contiguous longitudinal edges 120 are illustrated as points. Thus, the edge between panels 112A and 112B is labeled as point 142. The edge between panels 112B and 112C is labeled as point 144. The edge between panels 112A and 112B is labeled as point 142. The edges between panels 112C and 112D are labeled as point 146. Panel 112A also has an edge at the top of the trough which is illustrated as point 148 and panel 112D has bottom edge illustrated as point 150. It is important to note that the line segments between these points is a straight line and not curved as a result of the flat surface of the flat panels 112. In particular, the lines as viewed in a vertical cross section as illustrated in FIG. 9 are straight lines. Thus, the line connecting points 148 and 142 is a straight line, the line connecting points 142 and 144 is a straight line, the line connecting points 144 and 146 is a straight line, and the line connecting points 146 and 150 is a straight line.

Figure 6A:
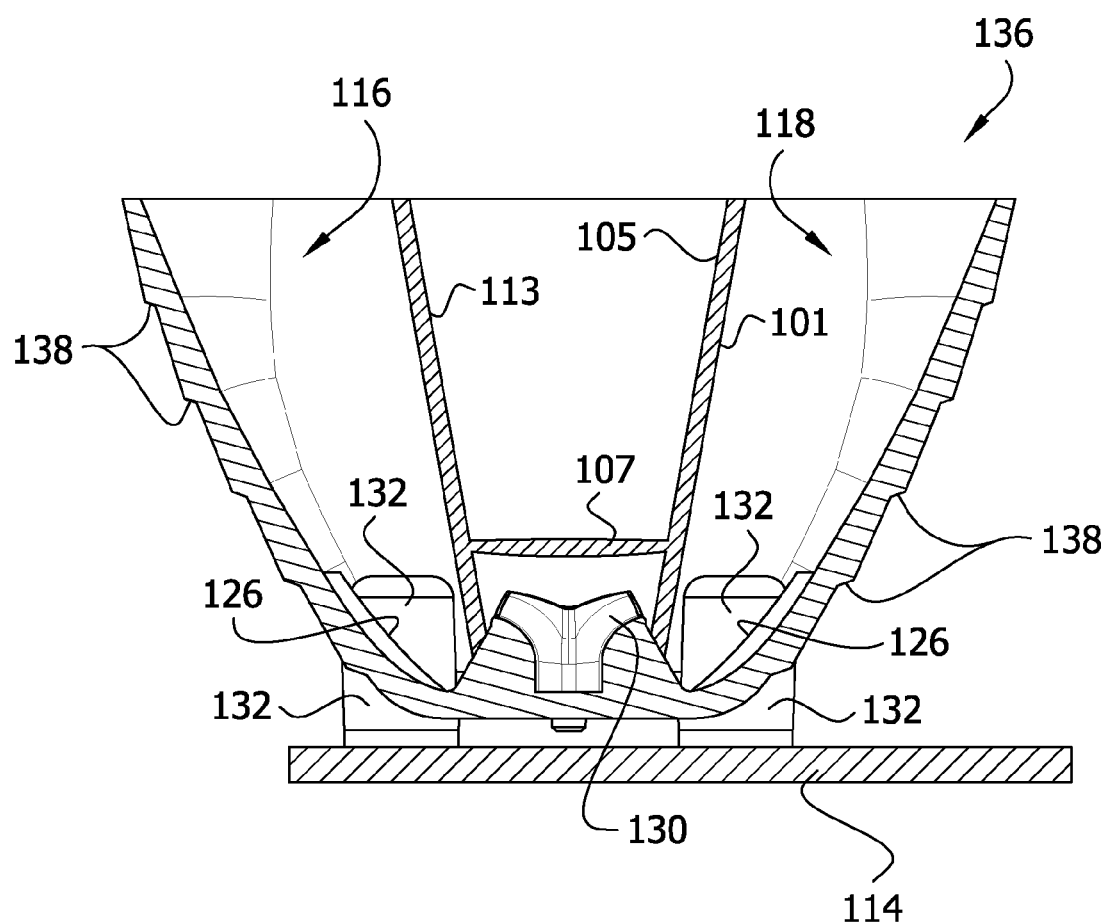
FIG. 6A is a cross sectional view of the light fixture of FIG. 1B taken along lines 6A-6A of FIG. 1B.

As shown in FIGS. 1B, 6A and 8A, the trough 100B in one embodiment may include one or more second reflective troughs 101 positioned within the trough 100B for providing reflected light RL transmitted through the linear lens array 106B. In the illustrations of FIGS. 6A and 8A, the trough 100B is shown to have the same configuration as the trough 100. Similarly, in one embodiment, reflective trough 101 may have flat, planar reflective sides 105 for reflecting light rays from the light sources 102. A gap 109 between the sides 105 of trough 101 and the sides 104 of trough 100B defines a channel which allows a substantial amount of direct light DL and scattered light SL from the light sources 102 to escape and be directed at an observer through the gap. In one embodiment the sides 105 of trough 101 may be parallel to the sides 104 of trough 100B. Also, the sides 105 may be one more or flat reflective panels 113 similar to the reflective panels 112 of sides 104 as illustrated in FIG. 6A.

Referring to FIGS. 10-17, a fifth embodiment of a light fixture is generally indicated at 200. This light fixture is similar to the light fixture 110 in FIG. 1B in that both light fixtures include multiple, e.g., two, trough reflectors. In particular, the illustrated light fixture 200 includes an outer trough reflector, generally indicated at 202, an inner trough reflector, generally indicated at 204, and one or more light sources 205 (e.g., at least one LED). The outer trough reflector 202 includes a linear section 206 having opposing interior reflective surfaces 208 that are curved and generally parabolic. Opposite longitudinal ends 210 of the outer trough reflector 202 have interior reflective surfaces 212 that define portions of a paraboloid of revolution about an axis. As shown best in FIG. 13, the interior reflective surfaces 208, 212 of the outer trough reflector 202 together define an outer reflecting cavity 214 having an entrance slot 215 at a narrow end for receiving the light source 205 and an exit slot 216 at wide end through which light emitted from the light source exits the reflector. The outer reflecting cavity 214 has a linear focal axis FA (FIG. 13) extending generally along the linear section 206 adjacent to the entrance slot 215 and substantially orthogonal to the axes of revolution of the paraboloids defined by the ends 210. Although the illustrated outer trough reflector 202 is a parabolic trough reflector, it is understood that the outer trough reflector may be configured like the trough reflector 101 in the previous embodiments, which includes one or more flat reflective panels, 112, 113.

Referring to FIGS. 1-12, the inner trough reflector 204 includes a linear section 218 having opposing interior reflective surfaces 220 that are generally parabolic. Opposite longitudinal ends 222 of the inner trough reflector 204 have interior reflective surfaces 224 that define portions of a paraboloid of revolution about an axis. As shown best in FIG. 13, the interior reflective surfaces 220, 224 of the inner trough reflector 204 define an inner reflecting cavity 226 having an entrance slot 228 at a narrow end for receiving light from the light source 205, and an exit slot 230 at a wide end through which light emitted from the light source exits the reflector. The entrance slot 228 of the inner reflecting cavity 226 is adjacent to and spaced apart from the entrance slot 215 of the outer reflecting cavity 214 so that a portion of the total light emitted from the light source 205 can enter the outer reflecting cavity. The inner reflecting cavity 226 has a linear focal axis FA extending generally along the linear section 218 adjacent to the entrance slot 228 and orthogonal to the axes of revolution of the paraboloids defined by the ends 222. The imaginary linear focal axes of the outer reflecting cavity 214 and the inner reflecting cavity 226 are substantially coaxial and, as such, both imaginary linear focal axes are indicated by FA. In the illustrated embodiment, the imaginary linear focal axes FA pass through the light sources 205, more specifically, the enters of illumination of the light sources CI, for reasons explained below.

Figure 11:
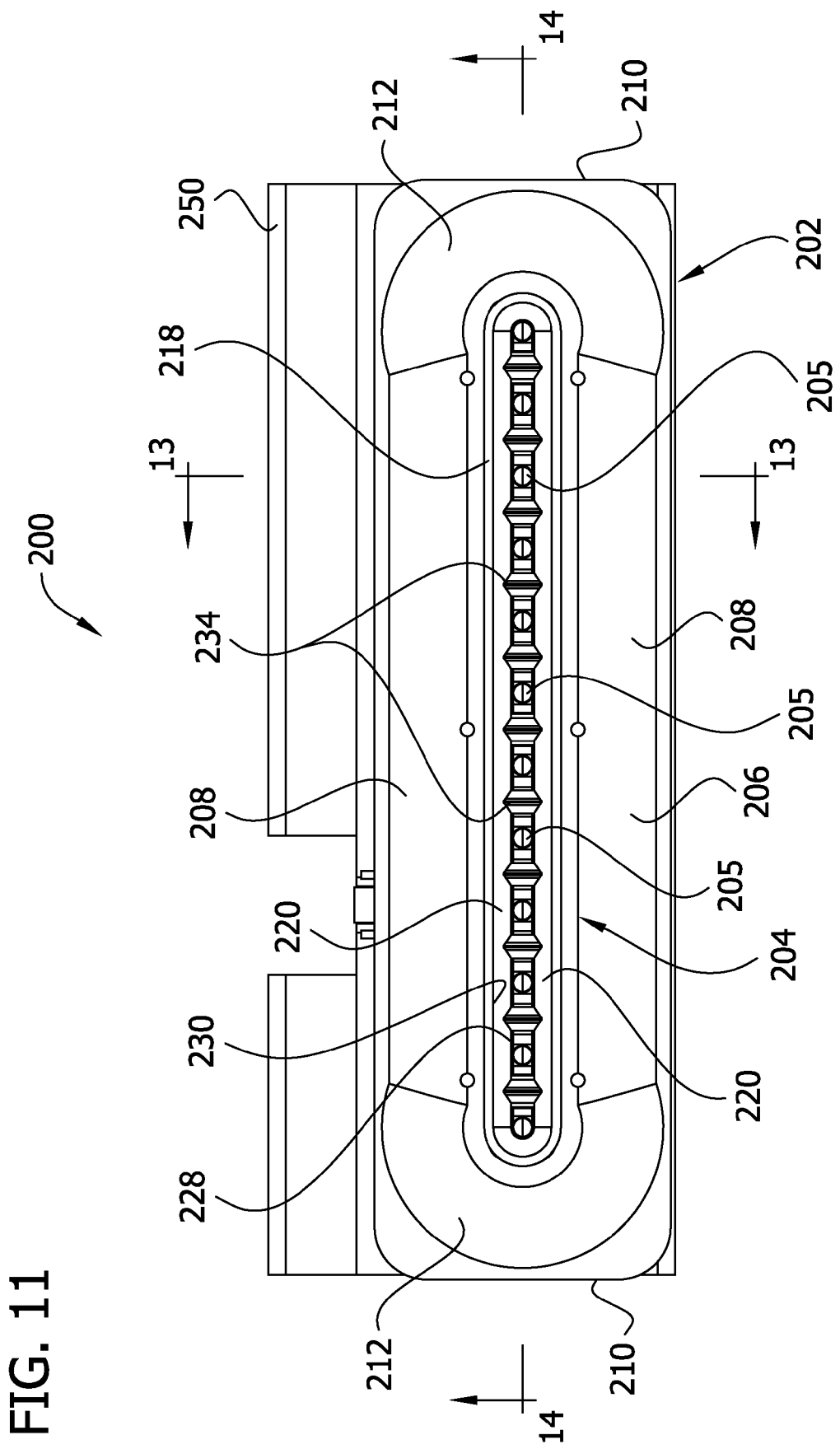
FIG. 11 is a front elevational view of the light fixture.
Figure 14:
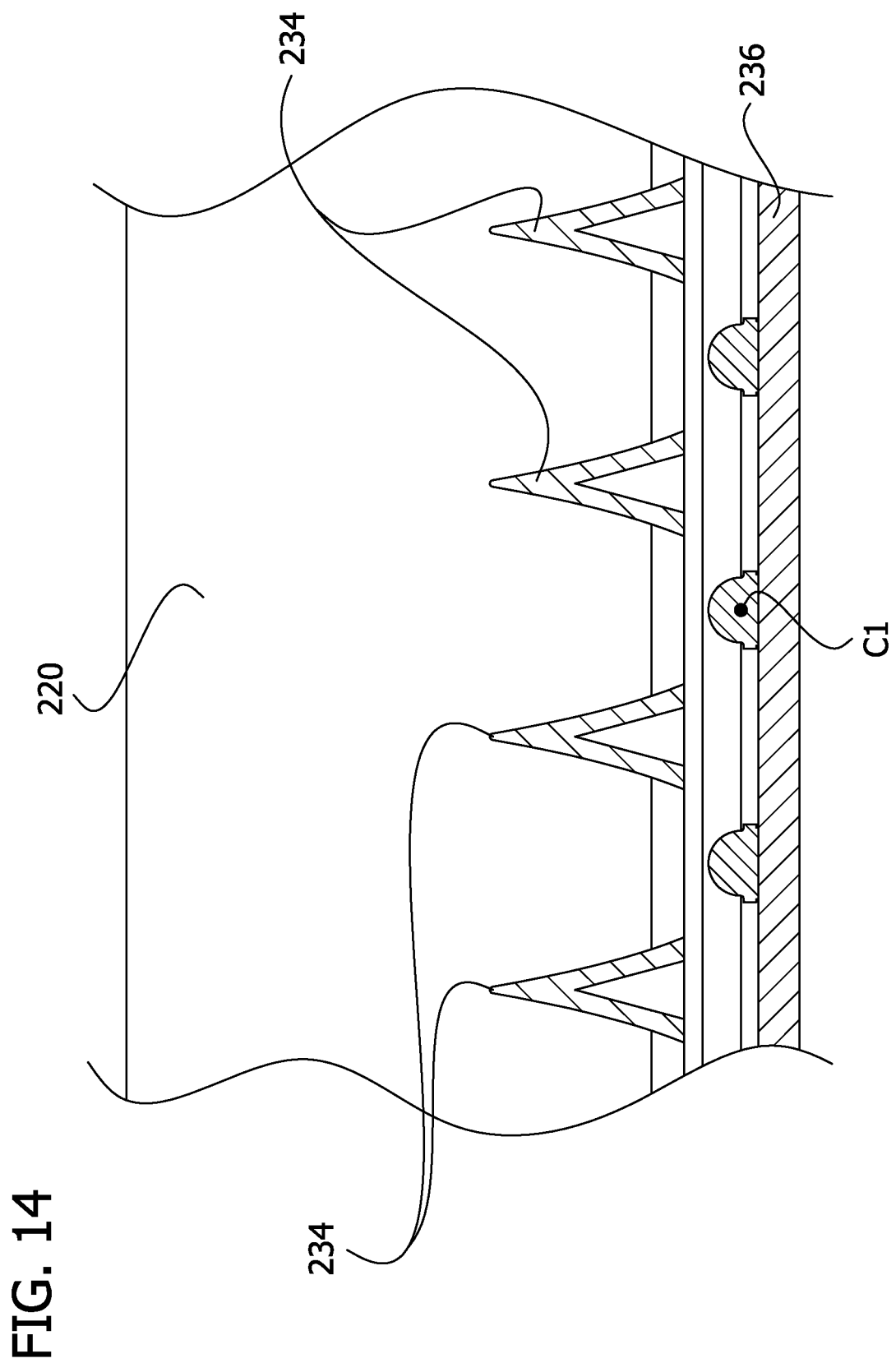
FIG. 14 is a longitudinal section of the light fixture with the bracket removed.

Referring to FIGS. 11 and 14, the inner trough reflector 204 includes a plurality of interior reflectors 234 spaced apart along its linear section 218. The reflectors 234 are generally wedge-shaped with reflective, generally planar sides. The reflectors 234 are attached to the interior reflective surfaces 220 and taper from adjacent the inlet opening 228 toward the exit opening 230 of the inner trough reflector 204. The inner trough reflector 204, including the interior reflectors 234, may be formed as a one-piece, integral unit, such as by molding, or may be formed in other ways. As explained in more detail below, one of a plurality of the light sources 205 (e.g., an LED) is located between each pair of adjacent interior reflectors 234. As also explained in more detail below, a lower surface 237 of the inner trough reflector 204, adjacent to the entrance slot 228, is beveled and reflective.

Figure 12:
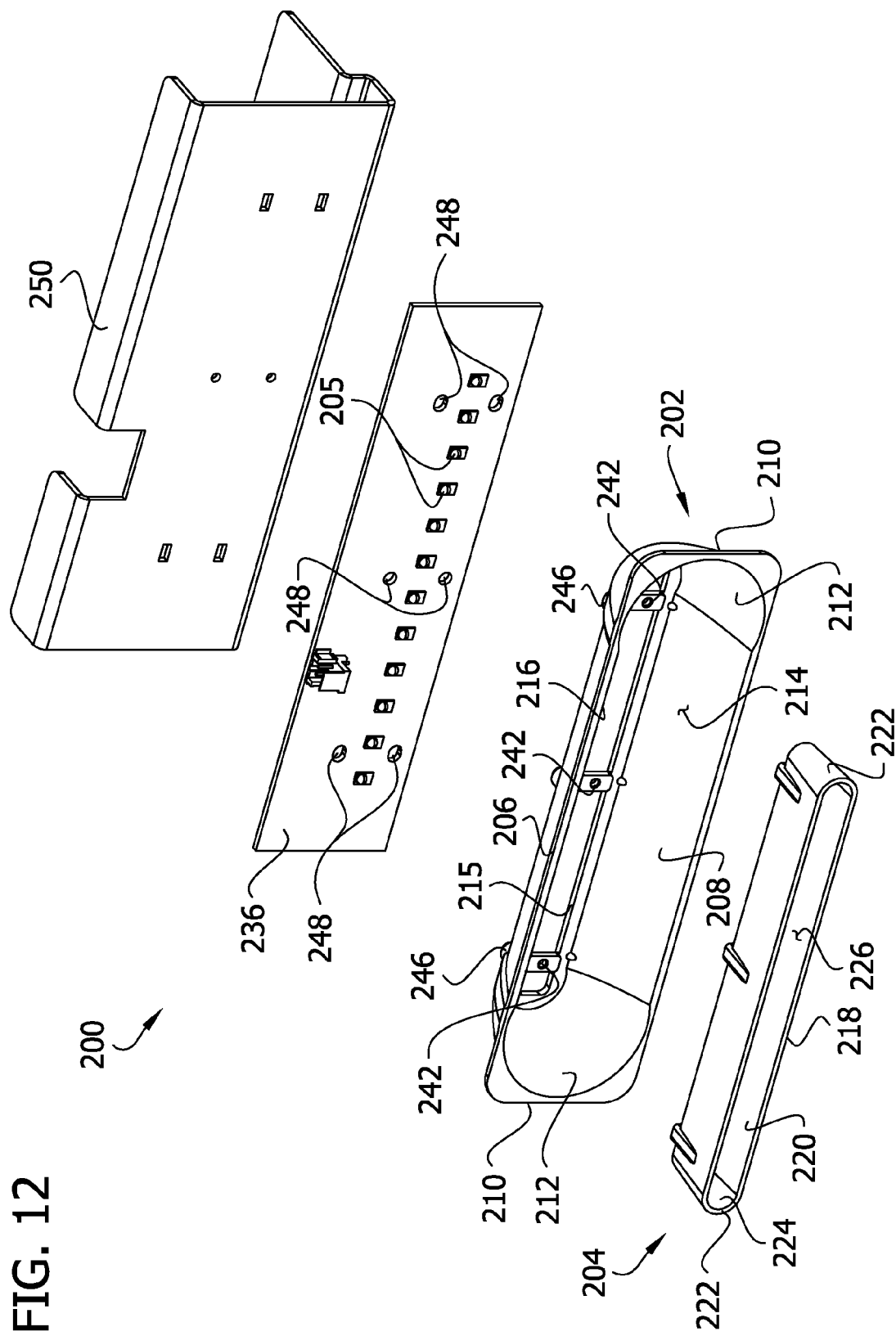
FIG. 12 is an exploded view of the light fixture.

Referring to FIGS. 11 and 12, the light source 205 of the illustrated light fixture 200 includes a plurality of LEDs. The LEDs 205 are mounted on a printed circuit board 236, which is secured to the outer trough reflector 202 so that the LEDs extend into the entrance slot 216 of the outer trough reflector 204. The LEDs 205 may be mounted on the circuit board 236 and powered in the same manner as described above for the prior embodiments. More specifically, the circuit board 236 is a metal core printed circuit board carrying a light engine (not shown) for connection to and for energizing the LEDs 205. In general, the light engine may be any circuit used to illuminate the LEDs 205.

Figure 13:
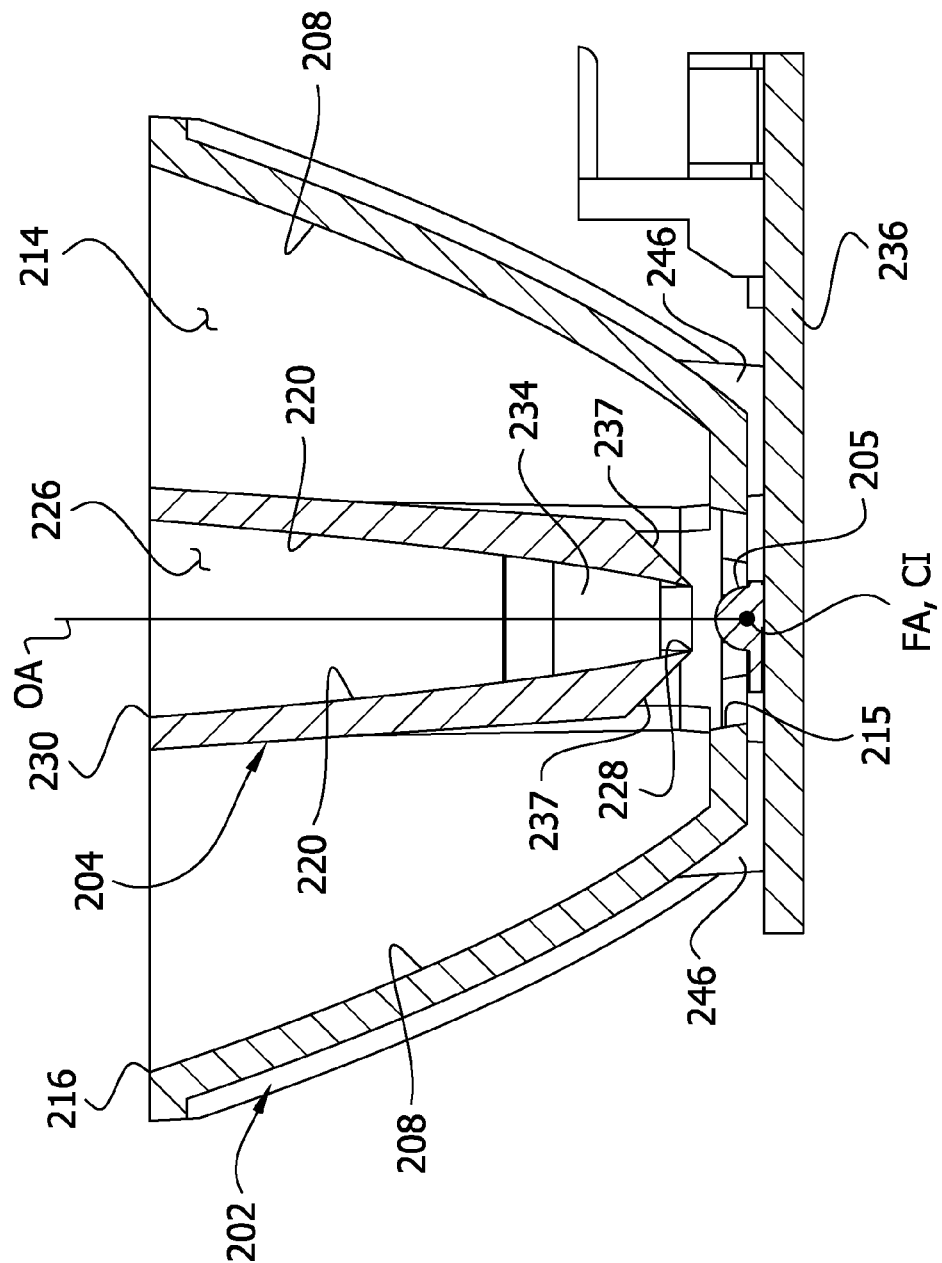
FIG. 13 is a cross-sectional view of the light fixture with the bracket removed.

Referring to FIG. 13, each LED 205 has an imaginary optical axis OA extending through centers of the inner and outer reflecting cavities 214, 226 substantially orthogonal to the imaginary linear focal axes FA of the reflecting cavities (only one LED is shown in FIGS. 13 and 15-17 with the understanding the sectional views through the other LEDs are substantially identical). Moreover, the linear focal axes FA of the inner and outer reflecting cavities 214, 226 extend substantially through the centers of illumination CI of the LEDs 205 from which light rays are emitted.

Figure 15:
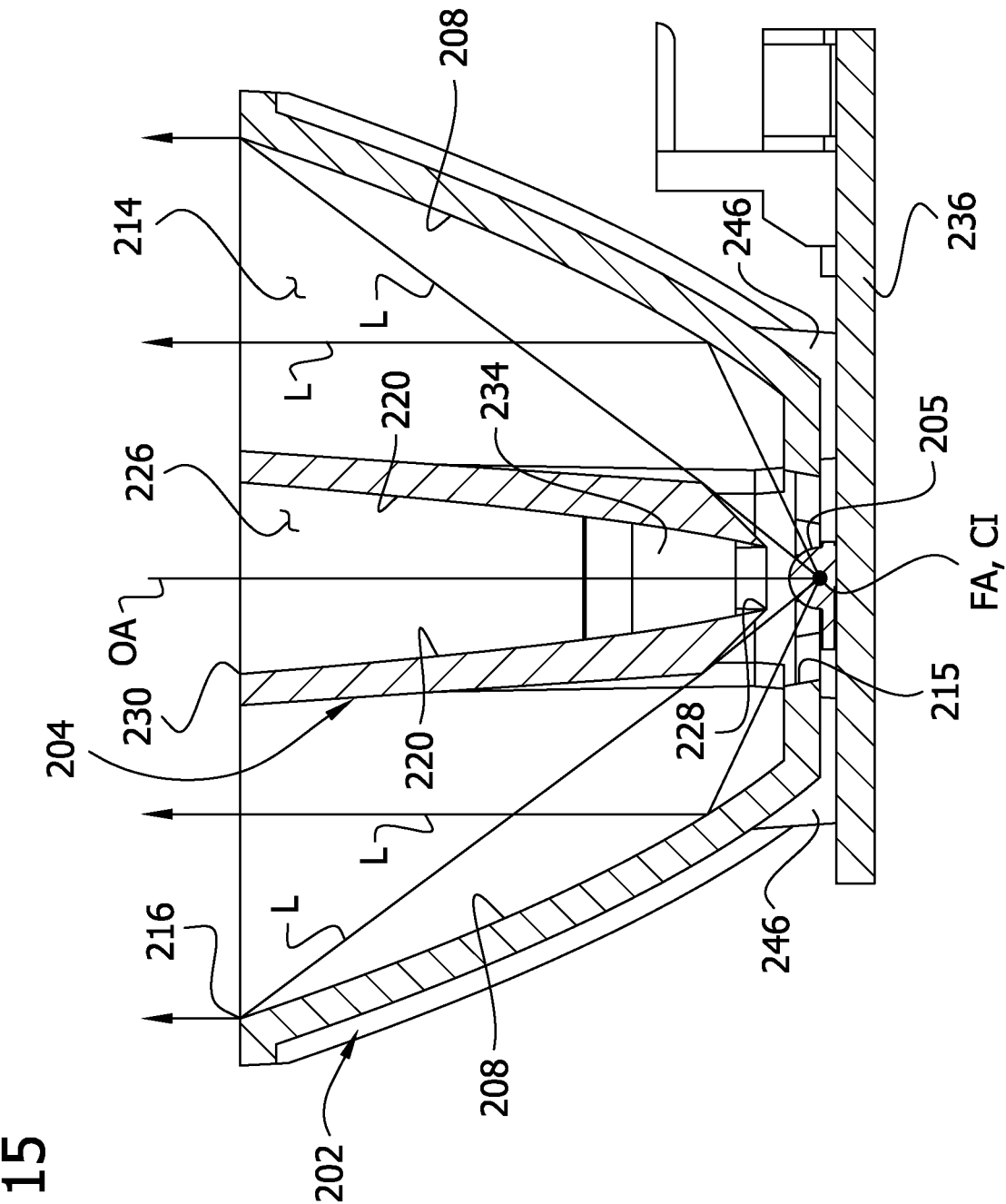
FIG. 15 is similar to FIG. 13 including ray traces incident upon reflective interior surfaces of the outer trough reflector.

Referring to FIG. 15, in use the reflective interior surfaces 208 of the outer trough reflector 202 substantially collimate unimpeded incident light L that is emitted from each LED 205. More specifically, the unimpeded incident light L emitted from the corresponding LED 205 travels between the beveled reflective lower surface 237 of the inner trough reflector 204 and a lower edge of the outer trough reflector 202. After passing therebetween, the light L travels to the reflective interior surface 208 of the outer trough reflector 202 where the light L is reflected so that the light exits the trough reflector generally parallel to the imaginary optical axis OA. In the illustrated embodiment, light L emitted in planes transverse to the imaginary linear focal axes FA and at angles within a range of about 30 degrees to about 72 degrees offset from the optical axis OA are reflected and collimated by the interior surfaces 208 of the outer trough reflector 202. Light L emitted at an angle less than about 30 degrees does not enter the outer trough reflector 202.

Figure 16:
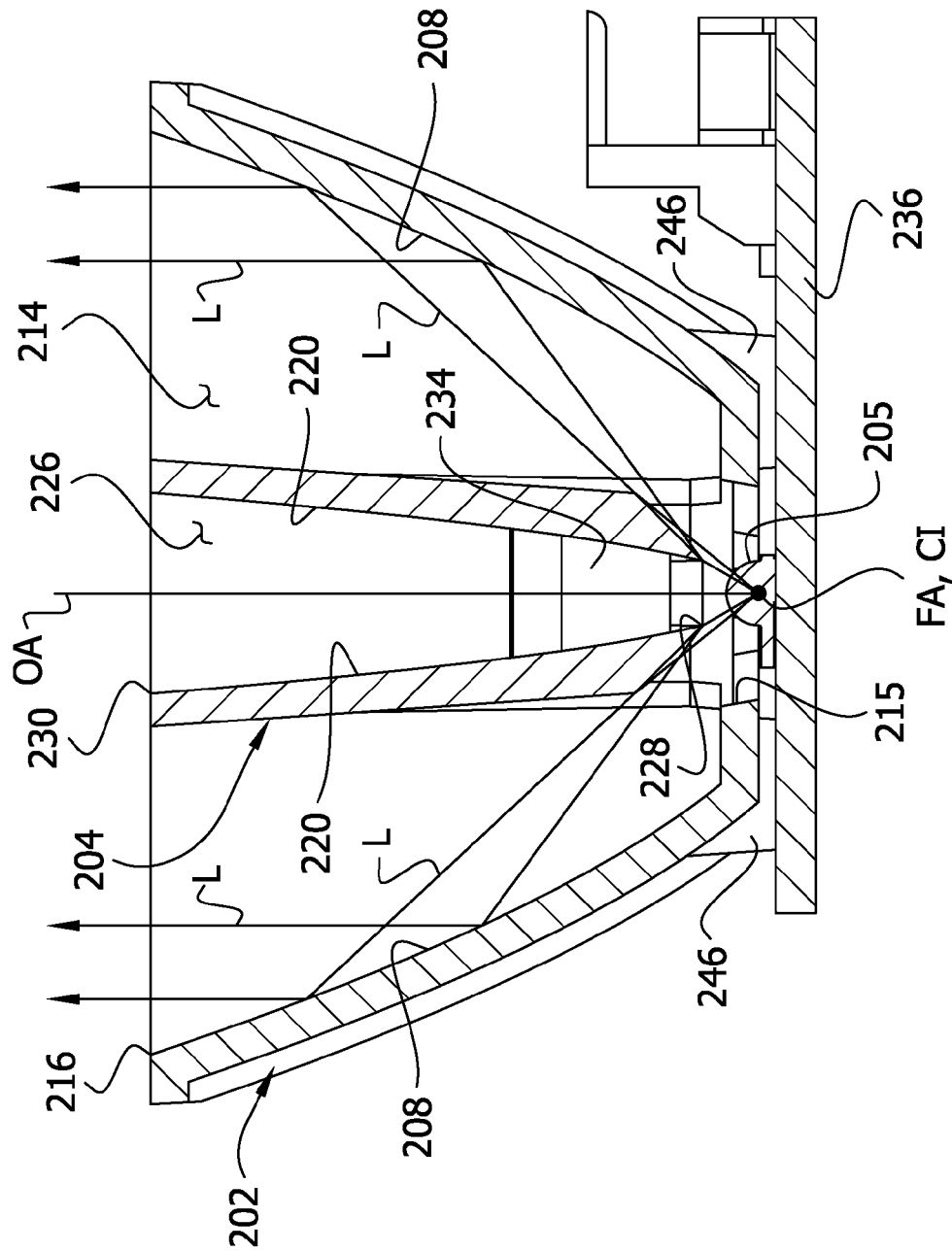
FIG. 16 is similar to FIG. 15 including ray traces incident upon beveled, reflective exterior surfaces of the inner trough reflector.

Referring to FIG. 16, each beveled reflective lower surface 237 of the inner trough reflector 204 reflects incident light L emitted from the LEDs 205 and directs the light to the interior reflective surfaces 208 of the outer trough reflector 202. In the illustrated embodiment, the beveled lower surfaces 237 reflect the incident light L so that the light then reflects off the interior reflective surfaces of the outer trough reflector and exits the outer trough reflector at an angle offset from the optical axis OA (i.e., non-parallel to the optical axis). More specifically, in the illustrated embodiment the incident light L exits the outer trough reflector 202 at an angle that is offset between about 2.0 degrees and about 3.0 degrees, and preferably between about 2.2 degrees and about 2.8 degrees. Light L exiting the outer trough reflector 204 at angles offset at about 2 degrees from the optical axis OA produces a widthwise spread of light that is required by some emergency lighting specifications. (SAE J595 as an example.) In the illustrated embodiment, the beveled lower reflective surfaces 237 of the inner trough reflector 204 extend at 40 degree angles relative to the optical axis OA, and light emitted in planes transverse to the linear focal axes FA at angles within a range of between about 30 degrees and about 36 degrees offset from the optical axis is incident upon the beveled lower exterior surfaces 237 of the inner trough reflector 204. It is understood that each of the lower exterior surfaces 237 may be beveled at an angle other than 40 degrees. For example and without being limiting, each of the lower exterior surfaces 237 may be beveled at an angle within a range of about 15 degrees to about 60 degrees and preferably within a range of about 40 degrees to about 50 degrees, relative to the optical axis OA. In another example, it is believed that a beveled angle of about 45 degrees would substantially collimate incident light L. Other angles are within the scope of the present invention.

Figure 17:
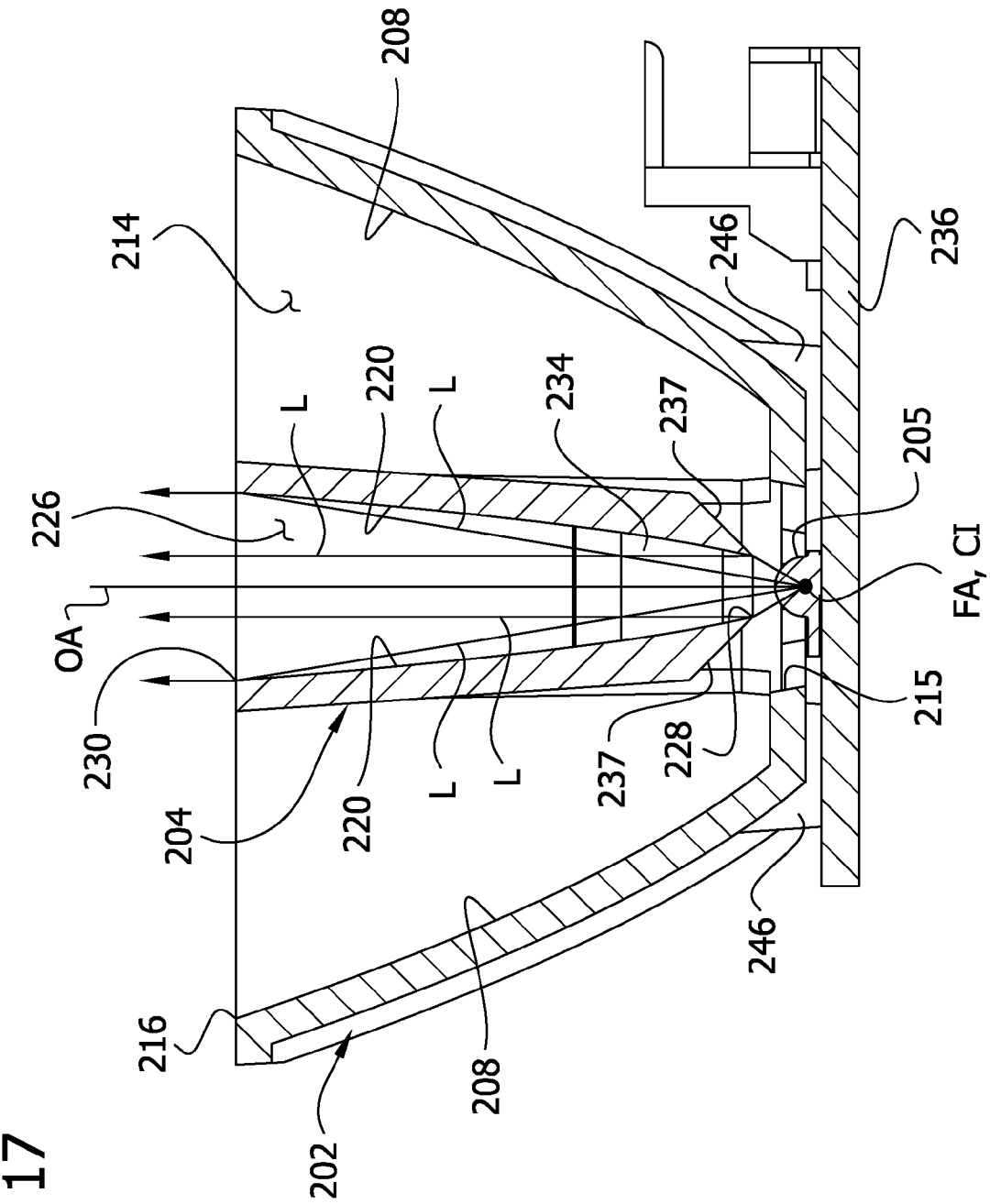
FIG. 17 is similar to FIG. 15 including ray traces incident upon reflective interior surfaces of the inner trough reflector.

Referring to FIG. 17, the reflective interior surfaces 220 of the inner trough reflector 204 substantially collimate incident light L that is emitted from each LED 205. More specifically, the incident light L emitted from the LED 205 enters the inner trough reflector 204 through the entrance slot 228 and reflects off the reflective interior surfaces 220 so that the light exits the inner trough reflector generally parallel to the optical axis OA. In the illustrated embodiment, the light L emitted from the LEDs 205 in planes generally transverse to the linear focal axes FA at angles within a range of about 10 degrees to about 30 degrees offset from the optical axis OA is incident upon the reflective interior surfaces 220 of the inner trough reflector 204.

Referring to FIG. 14, the generally planar reflective surfaces of the interior reflectors reflect incident light emitted from the LEDs to spread the light along the longitudinal axis of the inner trough reflector. In the illustrated embodiment, the light emitted from the LEDs in imaginary planes passing through the interior reflectors and the optical axis at angles within a range of greater than 26 degrees offset from the optical axis to about 52 degrees offset from the optical axis exits is incident upon the generally planar reflective surfaces of the interior reflectors.

Referring to FIG. 17, some light (not shown) emitted from each LED 205 passes through the inner trough reflector 204 unimpeded (i.e., not reflected) by the reflective interior surfaces 220 of the inner trough reflector or the interior reflectors 234. In the illustrated embodiment, light emitted from the LEDs 205 in planes generally transverse to the linear focal axes FA and at angles within a range of between about 0 degrees and about 9.4 degrees offset from the optical axis OA exits substantially at the same angle relative to the optical axis at which it emits from the LED. Moreover, light L emitted from the LEDs 205 in imaginary planes passing through the interior reflectors 234 and the optical axis OA at angles within a range of between about 0 degrees and about 26 degrees offset from the optical axis exits the inner trough reflector substantially at the same angle relative to the optical axis at which it emits from the LED.

Referring to FIG. 12, in one embodiment the inner trough reflector 204 and the outer trough reflector 202 are formed separately. For example, each trough reflector 202, 204 may be formed from polycarbonate material, such as by molding, and the reflective interior surfaces 212, 220, 224 of each trough and the reflective lower exterior surfaces 237 of the inner trough reflector 204 adjacent to the light sources 205 may be metalized with aluminum to provide a reflective surface. The outer and inner trough reflectors 202, 204 may be formed from other material and may be metalized in other ways without departing from the scope of the present invention.

The separately formed trough reflectors 202, 204 may be secured to one another, such as by heat staking. Each trough reflector 202, 204 may include attachment ribs 242 (only attachment ribs on the outer trough reflector are illustrated). Openings in the attachment ribs 242 of the inner trough reflector 204 are alignable with respective openings in the attachments ribs of the outer trough reflector 202 so that stakes can be inserted into the respective aligned openings. Other ways of securing the inner trough reflector 204 to the outer trough reflector 202 do not depart from the scope of the present invention. Moreover, the trough reflectors 202, 204 may be integrally formed as a one-piece component.

Referring still to FIG. 12, in the illustrated embodiment, the outer trough reflector 202 is secured to the circuit board 236 using fasteners (not shown) inserted through bosses 246 (FIGS. 3 and 4) on the outer trough reflector and into openings 248 in the circuit board. Other ways of securing the outer trough reflector 202 and/or the inner trough reflector 204 to the circuit board 236 do not depart from the scope of the present invention.

In the illustrated embodiment, the circuit board 236 is attached to a support or bracket 250, which is in turn attached to a light bar (not shown). More specifically, the bracket 250 is attached to an extruded longitudinal member of the light bar, which supports various light fixtures in a particular orientation with other fixtures to keep the fixture aligned within the light bar. For example, the light fixture 200 may be positioned on the light bar to illuminate observers and would be positioned so that the collimated light would be perpendicular to an outer shell or lens of the light bar.

Having described embodiments of the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A light fixture comprising:
a light source for emitting light;
an outer trough reflector having a length and opposing reflective interior surfaces extending along the length of the outer trough reflector and at least partially defining an outer reflecting cavity, the reflective interior surfaces of the outer trough reflector being configured to reflect incident light emitted from the light source so that the incident light exits the outer trough reflector in a first direction;
an inner trough reflector disposed in the outer reflecting cavity, the inner trough reflector having a length and opposing reflective interior surfaces extending along the length of the inner trough reflector and at least partially defining an inner reflecting cavity, the reflective interior surfaces of the inner trough reflector being configured to reflect incident light emitted from the light source so that the incident light exits the inner trough reflector in the first direction;
a plurality of interior reflectors in the inner reflecting cavity between the reflective interior surfaces, the interior reflectors being spaced apart from one another along the length of the inner trough reflector and having reflecting surfaces extending generally transverse to the length of the inner trough reflector that are configured to reflect incident light emitted from the light source so that the incident light exits the inner trough reflector in the first direction.

2. A light fixture as set forth in claim 1 wherein the reflective interior surfaces of the outer trough reflector and the inner trough reflector are generally parabolic, the outer reflecting cavity and the inner reflecting cavity each having an imaginary linear focal axis.

3. A light fixture as set forth in claim 2 wherein the imaginary linear focal axes or the outer reflecting cavity and the inner reflecting cavity are coaxial.

4. A light fixture as set forth in claim 3 wherein the imaginary linear focal axes of the outer reflecting cavity and the inner reflecting cavity intersect the light source, and wherein the light source has an optical axis that is generally orthogonal to the linear focal axes of the outer reflecting cavity and the inner reflecting cavity.

5. A light fixture as set forth in claim 1 wherein the inner trough reflector has opposite exterior side surfaces extending along the length of the inner trough reflector, and a lower portion adjacent to the light source that is beveled from the exterior side surfaces to the interior surfaces of the inner trough reflector, wherein the lower portion is reflective and configured to reflect incident light, emitted from the light source, to the reflective interior surfaces of the outer trough reflector, where the incident light is reflected and exits the outer trough reflector.

6. A light fixture as set forth in claim 5 wherein the outer trough reflector and the inner trough reflector are configured to collimate the incident light emitted from the light source, wherein the lower portion of the inner trough reflector is configured to reflect incident light, emitted from the light source, to the reflective interior surfaces of the outer trough reflector so that the incident light exits the outer trough reflector at an angle that is offset from the collimated incident light.

7. A light fixture as set forth in claim 5 wherein the lower portion of the inner trough reflector is beveled at an angle within a range of between about 40 degrees and about 50 degrees.

8. A light fixture as set forth in claim 1 wherein the reflecting surfaces of the interior reflectors are generally planar and configured to generally scatter incident light.

9. A light fixture as set forth in claim 8 wherein each interior reflector is generally wedge-shaped having opposite sides, each interior reflector including reflective surfaces at the opposite sides of the reflector.

10. A light fixture as set forth in claim 1 wherein the outer trough reflector and the inner trough reflector are configured to collimate incident light emitted from the light source.

11. A light fixture comprising:
a plurality of spaced apart LEDs arranged as a linear array;
a single outer trough reflector having a length and opposing reflective, parabolic interior surfaces extending along the length of the single outer trough reflector and at least partially defining a single outer reflecting cavity, the reflective, parabolic interior surfaces of the single outer trough reflector being configured to collimate incident light emitted from each of the LEDs so that collimated incident light exits the outer trough reflector in a first direction;
a single inner trough reflector disposed in the single outer reflecting cavity, the single inner trough reflector having a length and opposing reflective, parabolic interior surfaces extending along the length of the single inner trough reflector and at least partially defining a single inner reflecting cavity, the reflective, parabolic interior surfaces of the single inner trough reflector being configured to collimate incident light emitted from each of the LEDs so that collimated incident light exits the inner trough reflector in the first direction;
wherein the outer reflecting cavity and the inner reflecting cavity have coaxial imaginary linear focal axes.

12. A light fixture as set forth in claim 11 wherein the single inner trough reflector has opposite exterior side surfaces extending along the length of the inner trough reflector, and a lower portion adjacent to the LEDs that is beveled from the exterior side surfaces to the interior surfaces of the single inner trough reflector, wherein the lower portion is reflective and configured to reflect incident light emitted from each of the LEDs to the reflective interior surfaces of the single outer trough reflector, where the incident light is reflected and exits the single outer trough reflector.

13. A light fixture as set forth in claim 12 wherein each LED has an imaginary optical axis, the lower portion of the single inner trough reflector being configured so that light that is reflected off the lower portion and the reflective interior surfaces of the single outer trough reflector exits the single outer trough reflector at an angle that is offset from the imaginary optical axis.

14. A light fixture as set forth in claim 12 wherein the lower portion of the single inner trough reflector is beveled at an angle within a range of between about 40 degrees and about 50 degrees.

15. A light fixture as set forth in claim 11 wherein the single inner trough reflector includes a plurality of interior reflectors in the single inner reflecting cavity between the reflective interior surfaces, the interior reflectors being spaced apart from one another along the length of the single inner trough reflector and having a reflecting surface extending generally transverse to the length of the single inner trough reflector that are configured to reflect incident light emitted from each of the LEDs so that the incident light exits the single inner trough reflector.

16. A light fixture comprising:
a light source for emitting light;
an outer trough reflector having a length and opposing reflective interior surfaces extending along the length of the outer trough reflector and at least partially defining an outer reflecting cavity, the reflective interior surfaces of the outer trough reflector being configured to reflect incident light emitted from the light source so that the incident light exits the outer trough reflector in a first direction;
an inner trough reflector disposed in the outer reflecting cavity, the inner trough reflector having a length and opposing reflective interior surfaces extending along the length of the inner trough reflector and at least partially defining an inner reflecting cavity, the reflective interior surfaces of the inner trough reflector being configured to reflect incident light emitted from the light source so that the incident light exits the inner trough reflector in the first direction, wherein an entirety of the light source is spaced apart from the inner trough reflector.

17. A light fixture set forth in claim 16, wherein the light source has an optical axis extending through the inner reflecting cavity, the light source being spaced apart from the inner trough reflector such that light rays emitted from the light source at an angle greater than 30 degrees offset from the optical axis do not enter the inner reflecting cavity.

18. A light fixture set forth in claim 16, wherein the inner trough reflector has opposite exterior side surfaces extending along the length of the inner trough reflector, and a lower portion adjacent to the light source that is beveled from the exterior side surfaces to the interior surfaces of the inner trough reflector, wherein the lower portion is reflective and configured to reflect incident light, emitted from the light source, to the reflective interior surfaces of the outer trough reflector, where the incident light is reflected and exits the outer trough reflector.

19. A light fixture set forth in claim 18 further comprising a plurality of interior reflectors in the inner reflecting cavity between the reflective interior surfaces, the interior reflectors being spaced apart from one another along the length of the inner trough reflector and having reflecting surfaces extending generally transverse to the length of the inner trough reflector that are configured to reflect incident light emitted from the light source so that the incident light exits the inner trough reflector.

20. A light fixture set forth in claim 19, wherein the light source comprises a plurality of LEDs spaced apart from one another with respect to the length of the inner trough reflector, wherein the LEDs are located between adjacent ones of the interior reflectors with respect to the length of the inner trough reflector.

* * * * *